US012424699B2

(12) United States Patent
Matsumura et al.

(10) Patent No.: US 12,424,699 B2
(45) Date of Patent: Sep. 23, 2025

(54) POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

(72) Inventors: Nobuyuki Matsumura, Mie (JP); Hiroki Shimoda, Mie (JP); Motoyoshi Okumura, Aichi-ken (JP); Takuro Kikuchi, Aichi-ken (JP); Satoshi Morioka, Aichi-ken (JP); Daiki Terashima, Aichi-ken (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 766 days.

(21) Appl. No.: 17/771,050

(22) PCT Filed: Oct. 20, 2020

(86) PCT No.: PCT/JP2020/039362

§ 371 (c)(1), (2) Date: Apr. 22, 2022

(87) PCT Pub. No.: WO2021/090672

PCT Pub. Date: May 14, 2021

(65) Prior Publication Data

US 2022/0376351 A1 Nov. 24, 2022

(30) Foreign Application Priority Data

Nov. 7, 2019 (JP) ................................ 2019-202243

(51) Int. Cl.
*H01M 50/296* (2021.01)
*H01G 11/22* (2013.01)
(Continued)

(52) U.S. Cl.
CPC .......... *H01M 50/296* (2021.01); *H01G 11/22* (2013.01); *H01G 11/78* (2013.01);
(Continued)

(58) Field of Classification Search
CPC ........ H01G 11/12; H01G 11/22; H01G 11/76; H01G 11/78; H01G 11/82; H01M 50/51;
(Continued)

(56) References Cited

U.S. PATENT DOCUMENTS

2015/0236387 A1 8/2015 Kasugai et al.
2016/0254515 A1* 9/2016 Shimoda ............ H01M 50/262 429/61
(Continued)

FOREIGN PATENT DOCUMENTS

JP 48-010538 2/1973
JP 49-124518 10/1974
(Continued)

OTHER PUBLICATIONS

International Search Report issued in International Pat. Appl. No. PCT/JP2020/039362, dated Dec. 28, 2020, along with an English translation thereof.

*Primary Examiner* — Matthew T Martin
*Assistant Examiner* — Jared Hansen
(74) *Attorney, Agent, or Firm* — Greenblum & Bernstein, P.L.C.

(57) ABSTRACT

A power storage module includes power storage elements having electrode surfaces of positive electrode surfaces and
(Continued)

negative electrode surfaces on front and back surfaces thereof, a conductive member electrically connected to the electrode surfaces of the power storage elements, and a wiring module electrically connected to the conductive member. The power storage elements are arranged in an arrangement direction such that the electrode surfaces of the power storage elements that are adjacent to each other are opposed to each other. The electrode surfaces of the power storage elements that are adjacent to each other are electrically connected by the conductive member that is disposed between the power storage elements that are adjacent to each other. The wiring module is disposed between the power storage elements that are adjacent to each other. The conductive member and the wiring module are disposed inside an outline of the power storage elements seen from the arrangement direction.

7 Claims, 20 Drawing Sheets

(51) Int. Cl.

| | |
|---|---|
| ***H01G 11/78*** | (2013.01) |
| ***H01M 50/209*** | (2021.01) |
| ***H01M 50/298*** | (2021.01) |
| ***H01M 50/503*** | (2021.01) |
| ***H01M 50/548*** | (2021.01) |
| ***H01M 50/553*** | (2021.01) |
| ***H01M 50/574*** | (2021.01) |
| ***H01M 50/588*** | (2021.01) |
| ***H01M 50/591*** | (2021.01) |

(52) U.S. Cl.
CPC ....... *H01M 50/209* (2021.01); *H01M 50/298* (2021.01); *H01M 50/503* (2021.01); *H01M 50/548* (2021.01); *H01M 50/553* (2021.01); *H01M 50/574* (2021.01); *H01M 50/588* (2021.01); *H01M 50/591* (2021.01)

(58) Field of Classification Search
CPC ............. H01M 50/209; H01M 50/258; H01M 50/289; H01M 50/296; H01M 50/298; H01M 50/503; H01M 50/514; H01M 50/548; H01M 50/553; H01M 50/557; H01M 50/569; H01M 50/574; H01M 50/588; H01M 50/591; H01M 50/593; Y02E 60/10
See application file for complete search history.

(56) References Cited

U.S. PATENT DOCUMENTS

| | | | | |
|---|---|---|---|---|
| 2018/0277969 | A1* | 9/2018 | Yaita .................. | H01M 10/482 |
| 2018/0294536 | A1* | 10/2018 | Kruszelnicki ....... | H01M 50/291 |
| 2019/0181403 | A1* | 6/2019 | Gu ....................... | H01M 50/30 |

FOREIGN PATENT DOCUMENTS

| | | |
|---|---|---|
| JP | 2011-071053 | 4/2011 |
| JP | 2013-171617 | 9/2013 |
| JP | 2014-086280 | 5/2014 |

* cited by examiner 10
11
11
11
11
22
22
13
13
13
12A
19
16
14A
14B
12
12
12
12
15
15
Z
Y 13
41
40
Z
Y
24
20
23
21
58
22
22
59
54
53
63
37
65
38
64
62(60)
49
75
44
69
50
19
45
12A
71
16
42
15
15
12

21
Z
Y
X
27
27
43
43
13
20
23
24
41
44
54
53
49
39

Z
Y
X
27
27
23
25
28
57
41
21
29
26
17
58
59
34
60
67
61
63
64
32
62
71
69
66
30
U
18
68
70
33
38
37
35
31
41
39

Z
Y
X
23
26
34
41
17
67
30
60
71
69
18
68
70
32
58
21
59
41
63
31
65
35
66
64
33
62
61
39

12
13
20
23
24
19
12A
16
18
71
69
XV
IX
61
68
XVI
70
75
77
72
73
67
34
62
55
64
XVI, IX, XV
17
44
50
74
76
72
73
66
33
54
49
53
Y
X 23
27
27
25
28
21
41
29
32
58
41
59
31
35
33
39
26
34
30
62
17
61
18
Z
Y
X 27
27
23
25
28
21
41
29
55
26
58
52
41
59
17
55
49
54
50
30
51
39
Z
Y
X 13
21
27
27
43
43
Z
Y
X
55
20
23
24
41
44
54
50
49
39

13
41
40
Z
Y
21
24
20
23
22
22
48
55
54
53
17
62(60)
72
49
75
50
30
44
69
45
19
12A
16
42
15
15
12

13
41
40
Z
Y
20
24
23
21
22
58
22
48
59
55
54
53
33
62(60)
66
35
73
17
72
49
76
50
30
74
44
68
19
45
12A
16
42
15
15
12

13
21
27
27
43
43
Z
Y
X
20
23
24
55
41
44
54
49
39

12
13
20
23
24
19
12A
16
71
69
VI
III
61
68
XIX
70
18
75
77
72
73
67
34
62
64
XIX, III, VI
17
44
74
76
72
73
66
33
54
49
53
Y
X

Z
Y
X
23
26
32
58
21
59
34
41
17
67
30
60
71
69
18
68
70
41
63
64
31
65
35
66
33
62
61
39

POWER STORAGE MODULE

TECHNICAL FIELD

The present disclosure relates to a power storage module.

BACKGROUND ART

An example of a power storage module including power storage elements is disclosed in Japanese Unexamined Patent Application Publication No. 2013-171617. The power storage elements have positive electrode surfaces and negative electrode surfaces on front and back surfaces, respectively. Such a power storage module includes a conductive plate member between the electrode surfaces of adjacent power storage elements. The conductive plate member includes an external terminal that is to be connected to an external circuit and the external terminal projects outward from one side edge of the conductive plate member. The external terminal is disposed in a connector arrangement section. The connector including a voltage detection terminal can be arranged in the connector arrangement section. The connector arrangement section projects outward from the outline of the power storage elements seen from the arrangement direction in which the power storage elements are arranged.

PRIOR ART DOCUMENT

Patent Document

[Patent Document 1] Japanese Unexamined Patent Application Publication No. 2013-171617

SUMMARY OF THE INVENTION

Problem to be Solved by the Invention

According to the above-described configuration, since the connector arrangement section projects outward from the outline of the power storage elements, the power storage module increases its size as a whole.

The technology described herein was made in view of the above circumstances. An object is to miniaturize a power storage module.

Means for Solving the Problem

A power storage module according to the present disclosure includes power storage elements having electrode surfaces of positive electrode surfaces and negative electrode surfaces on front and back surfaces thereof, a conductive member electrically connected to the electrode surfaces of the power storage elements, and a wiring module electrically connected to the conductive member. The power storage elements are arranged in an arrangement direction such that the electrode surfaces of the power storage elements that are adjacent to each other are opposed to each other. The electrode surfaces of the power storage elements that are adjacent to each other are electrically connected by the conductive member that is disposed between the power storage elements that are adjacent to each other. The wiring module is disposed between the power storage elements that are adjacent to each other. The conductive member and the wiring module are disposed inside an outline of the power storage elements seen from the arrangement direction.

Effects of Invention

According to the present disclosure, a power storage module can be miniaturized.

MODES FOR CARRYING OUT THE INVENTION

Figure 1:
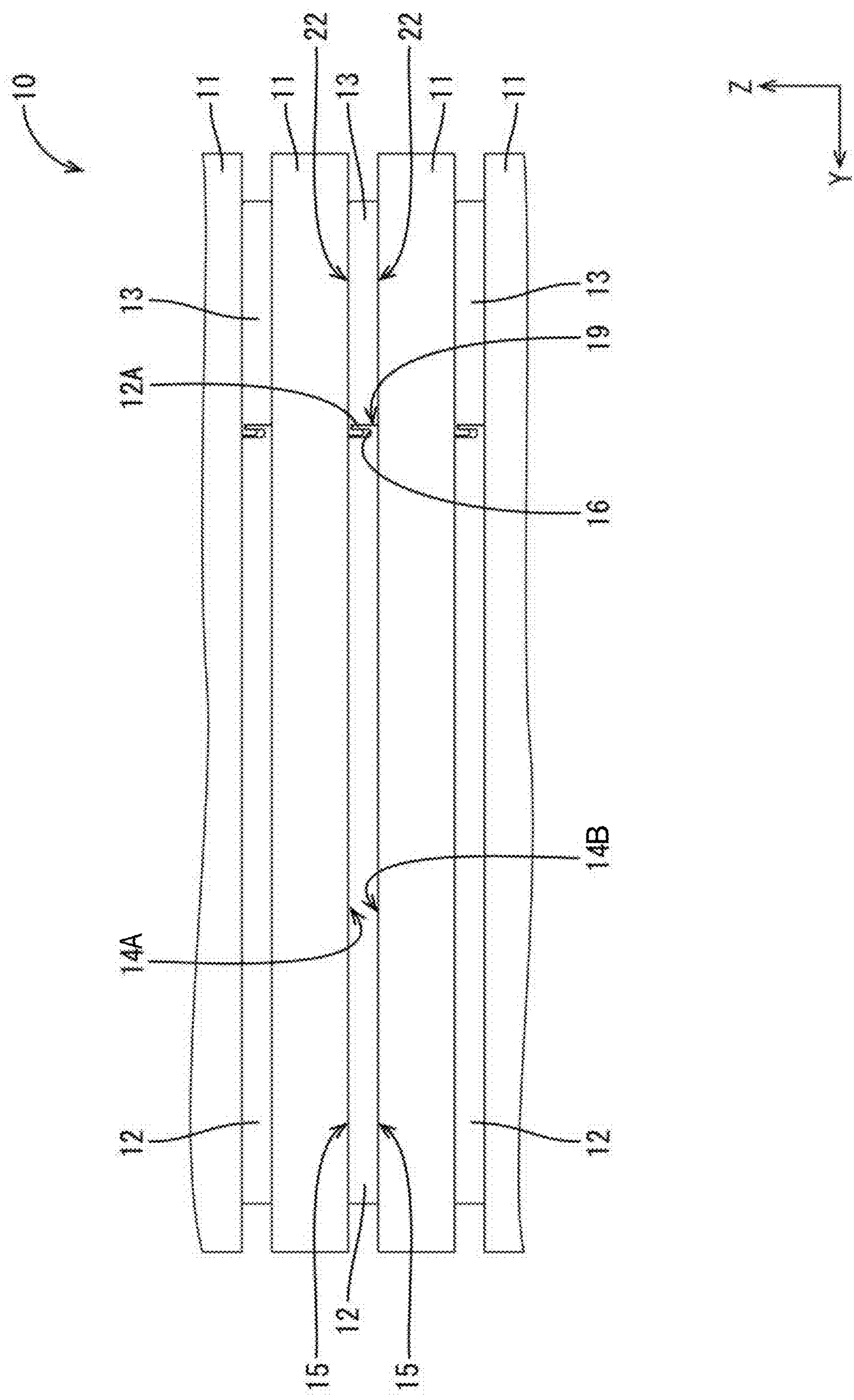
FIG. 1 is an enlarged side view illustrating a portion of a power storage module according to a first embodiment.

Description of Embodiments According to the Present Disclosure

First, embodiments according to the present disclosure will be listed and described.

(1) A power storage module according to the present disclosure includes power storage elements having electrode surfaces of positive electrode surfaces and negative electrode surfaces on front and back surfaces thereof, a conductive member electrically connected to the electrode surfaces of the power storage elements, and a wiring module electrically connected to the conductive member. The power storage elements are arranged in an arrangement direction such that the electrode surfaces of the power storage elements that are adjacent to each other are opposed to each other. The electrode surfaces of the power storage elements that are adjacent to each other are electrically connected by the conductive member that is disposed between the power storage elements that are adjacent to each other. The wiring module is disposed between the power storage elements that are adjacent to each other. The conductive member and the wiring module are disposed inside an outline of the power storage elements seen from the arrangement direction.

Since the conductive member and the wiring module are disposed inside the outline of the power storage elements seen from the arrangement direction, the power storage module can be miniaturized compared to a configuration in which the terminal to be connected to an external circuit projects from the edge of the conductive member.

(2) The conductive member may have a conductive member-side contact surface that is contacted with one of the electrode surfaces and the wiring module may have a wiring module-side contact surface that is contacted with the one of the electrode surfaces. The conductive member-side contact surface and the wiring module-side contact surface may be on a same plane.

Since the conductive member-side contact surface and the wiring module-side contact surface are on the same plane, no level difference is created at a border between the conductive member and the wiring module. According to such a configuration, the electrode surface of the power storage element is less likely to be deformed due to a step created by the level difference.

(3) The wiring module may include a housing having insulating properties, a terminal arranged in the housing, and an electric wire connected to the terminal. The terminal may include an elastic contact portion that is elastically deformable and the conductive member may have a terminal contact surface on a side edge that is not contacted with one of the electrode surfaces. The elastic contact portion of the terminal may be to be elastically contacted with the terminal contact surface.

With the elastic contact between the terminal contact surface of the conductive member and the elastic contact portion of the terminal, the conductive member and the terminal are electrically connected. Therefore, the power storage module is miniaturized compared to the configuration in which the terminal for the external connection projects from the side edge of the conductive member.

(4) The conductive member may include a groove adjacent to the side edge including the terminal contact surface and the groove may extend along the terminal contact surface. The wiring module may include a fitting portion to be fitted to the groove.

With the fitting portion of the wiring module being fitted to the groove of the conductive member, the conductive member and the wiring module are coupled to each other firmly. This improves reliability of electrical connection between the conductive member and the terminal included in the wiring module.

(5) With the wiring module and the conductive member being coupled together, the terminal may be disposed in the housing to be movable between a contact position in which the elastic contact portion is in contact with the terminal contact surface of the conductive member and a standby position in which the elastic contact portion is away from the terminal contact surface of the conductive member. The housing may include a standby position stopper for holding the terminal in the standby position and a contact position stopper for holding the terminal in the contact position.

With the terminal being in the standby position, the elastic contact portion of the terminal is away from the terminal contact surface. This suppresses deformation of the elastic contact portion caused by unintentional contact between the elastic contact portion and the terminal contact surface. Furthermore, electrical connection between the elastic contact portion and the terminal contact surface is surely established by moving the terminal in the contact position. This improves reliability of electrical connection between the conductive member and the terminal.

(6) One of the housing and the terminal may include a front stopper that projects toward another one of the housing and the terminal to suppress the terminal from moving closer to the terminal contact surface further from the contact position.

With the front stopper, the terminal is less likely to move closer to the terminal contact surface too much. This suppresses the elastic contact portion from being warped excessively. Accordingly, reliability of electrical connection between the conductive member and the terminal can be improved.

(7) The housing may include a window hole in a section thereof corresponding to the terminal and the housing may further include a terminal cover that covers the window hole and is movable between a temporary holding position and a holding position. The terminal cover may include a first holder for holding the terminal in the standby position with the terminal cover being held in the temporary holding position and a second holder for holding the terminal in the contact position with the terminal cover being held in the holding position.

By moving the terminal cover from the temporary holding position to the holding position, an operator can move the terminal from the standby position to the contact position without directly touching the terminal. This improves reliability in safety at the time of producing the power storage module.

(8) The terminal cover may integrally include a cover section via a hinge. The cover section may project from the housing when the terminal cover is in the temporary holding position and the cover section may be pivoted around the hinge to close the window opening when the terminal cover is in the holding position. With the window hole being covered with the terminal cover and the cover section, the housing, the terminal cover, and the cover section may be on a same plane.

The cover section projects from the housing when the terminal cover is in the temporary holding position. Therefore, the wiring module including the cover section projecting from the housing and the power storage element cannot be fitted together. On the other hand, when the terminal cover is in the holding position, the terminal cover and the cover section are on the same plane as the housing and therefore, the wiring module and the power storage element can be fitted together. According to such a configuration, an operator may not unintentionally mount the wiring module in which the terminal cover is held in the temporary holding position on the power storage element.

When the terminal cover is held in the holding position, the window hole is closed with the cover section and an operator is less likely to touch the terminal.

(9) The elastic contact portion may include an elastic piece that extends along the terminal contact surface and is elastically deformable in a direction crossing the terminal contact surface and a contact portion that is at an extended end of the elastic piece and projects toward the terminal contact surface. The terminal cover may include a pushing portion that comes in contact with the elastic piece and push the elastic piece toward the terminal contact surface with the terminal cover being held in the holding position.

With the pushing portion pushing the elastic piece toward the terminal contact surface, the contact portion can be surely contacted with the terminal contact surface. This improves reliability of electrical connection between the terminal and the conductive member.

(10) The housing may include a wire groove in which the electric wire is routed and a pair of wire stoppers may project from a bottom wall of the wire groove for holding the electric wire.

With the electric wire being held between the wire stoppers, tension that may be applied to the electric wire is less likely to be transferred to the terminal.

Detail of Embodiment According to the Present Disclosure

An embodiment according to the present disclosure will be described. The present disclosure is not limited to the embodiments. All modifications within and equivalent to the technical scope of the claimed invention may be included in the technical scope of the present invention.

First Embodiment

A first embodiment will be described with reference to FIGS. 1 to 20. A power storage module 10 according to this embodiment is installed in a vehicle as a power source for driving the vehicle (not illustrated) such as an electric automobile or a hybrid automobile. As illustrated in FIG. 1, the power storage module 10 includes power storage elements 11 that are arranged in an upper-bottom direction (one example of an arrangement direction), conductive members 12, and wiring modules 13. Each of the conductive members 12 is disposed between adjacent power storage elements 11. Each of the wiring modules 13 is disposed between the adjacent power storage elements 11 and electrically connected to each of the conductive members 12. In the following description, it is considered that an Z arrow, a Y arrow, and an X arrow point the upper side, the front side, and the left side, respectively. Regarding components having the same configuration, some of the components may be indicated by reference signs and others may not be indicated by the reference signs.

[Power Storage Element 11]

In FIG. 1, four power storage elements 11 out of the power storage elements 11 that are arranged in the upper-bottom direction are illustrated. Other power storage elements 11 that are upper or lower than the power storage elements 11 illustrated in FIG. 1 are not described.

Figure 2:
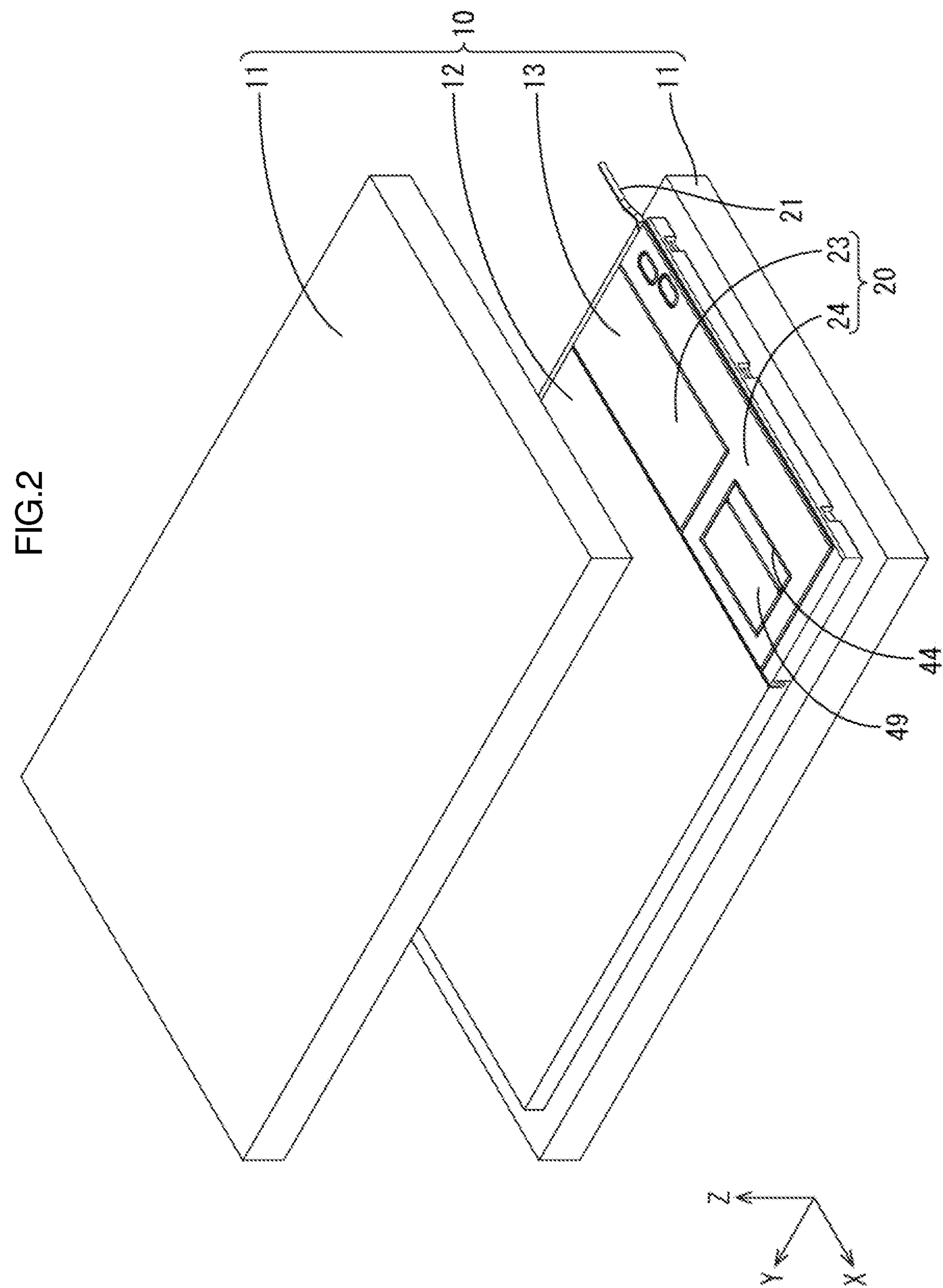
FIG. 2 is an exploded perspective view of a conductive member between two power storage elements and a wiring module.

As illustrated in FIG. 2, the power storage element 11 has a flat plate shape with respect to the upper-bottom direction. The power storage element 11 has a rectangular shape extending in a front-rear direction seen from above. The power storage element 11 includes a positive electrode surface 14A and a negative electrode surface 14B on front and rear surfaces (upper and lower surfaces) of the power storage element 11, respectively. The power storage elements 11 that are adjacent to each other in the upper-bottom direction are arranged such that the electrode surfaces 14A, 14B having different polarities are opposite each other. Although not illustrated, an entire peripheral side edge section of each power storage element 11 is covered with insulating synthetic resin.

[Conductive Member 12]

As illustrated in FIGS. 1 and 2, the conductive member 12 is disposed between two power storage elements 11 that are adjacent to each other in the upper-bottom direction. The conductive members 12 are formed by pressing electrically conductive metal plates into a predefined shape. Metal of which the conductive member 12 plates are made may be selected from any kinds of metal including copper, copper alloy, aluminum, and aluminum alloy where appropriate. In this embodiment, aluminum or aluminum alloy is used for the conductive members 12.

The conductive member 12 is a flat plate with respect to the upper-bottom direction and has a rectangular shape seen from above. The outline of the conductive member 12 is smaller than the outline of the power storage element 11 seen from above. An upper surface and a lower surface of the conductive member 12 are defined as conductive member-side contact surfaces 15 that are contacted with the electrode surfaces 14A, 14B. The upper surface of the conductive member 12 is contacted with the positive electrode surface 14A of the power storage element 11 that is disposed just above the conductive member 12. The lower surface of the conductive member 12 is contacted with the negative electrode surface 14B of the power storage element 11 that is disposed just below the conductive member 12.

The conductive member 12 includes a groove 16 on an upper surface thereof and in front of a rear edge of the conductive member 12. The groove 16 extends in the right-left direction. The groove 16 opens upward. The groove has a U-shaped cross section. The conductive member 12 has a rear edge end 12A and a level of the rear edge end 12A with respect to the upper-bottom direction is slightly lower than the upper surface of the conductive member 12. The rear surface of a rear wall of the conductive member 12 that is contacted with an elastic contact portion 18 of a terminal 17 (described later) is defined as a terminal contact surface 19.

[Wiring Module 13]

Figure 3:
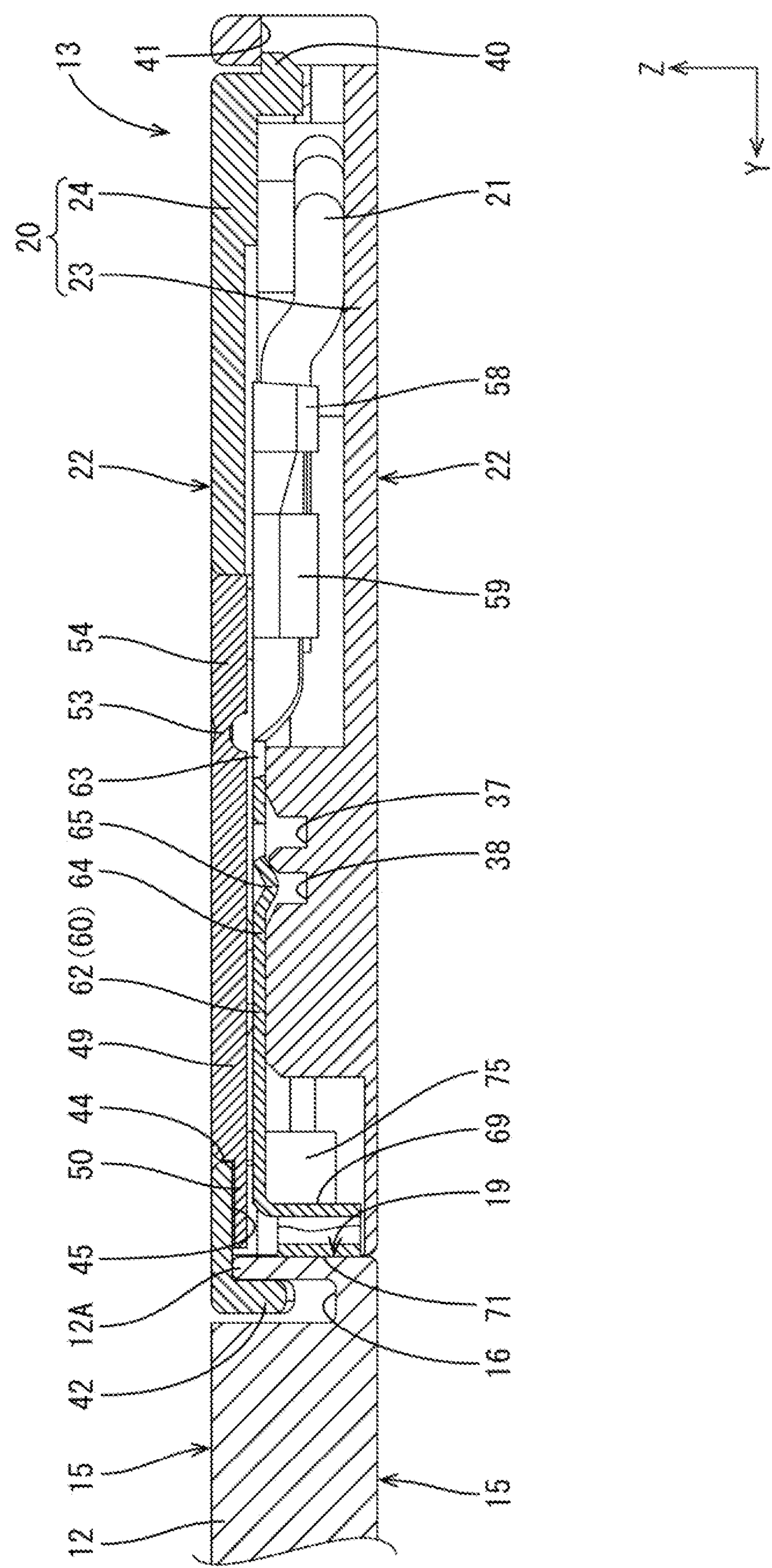
FIG. 3 is a cross-sectional view along line III II III-III in FIG. 18.

As illustrated in FIG. 3, the wiring module 13 includes a housing 20 that is made of insulating synthetic resin, the terminal 17 that is arranged in the housing 20, and an electric wire 21 that is connected to the terminal 17. The upper surface and the lower surface of the wiring module 13 are contacted with the electrode surfaces 14A, 14B of the power storage elements 11 that are disposed above and below the wiring module 13, respectively. The upper surface and the lower surface of the wiring module 13 are defined as wiring module-side contact surfaces 22.

Figure 4:
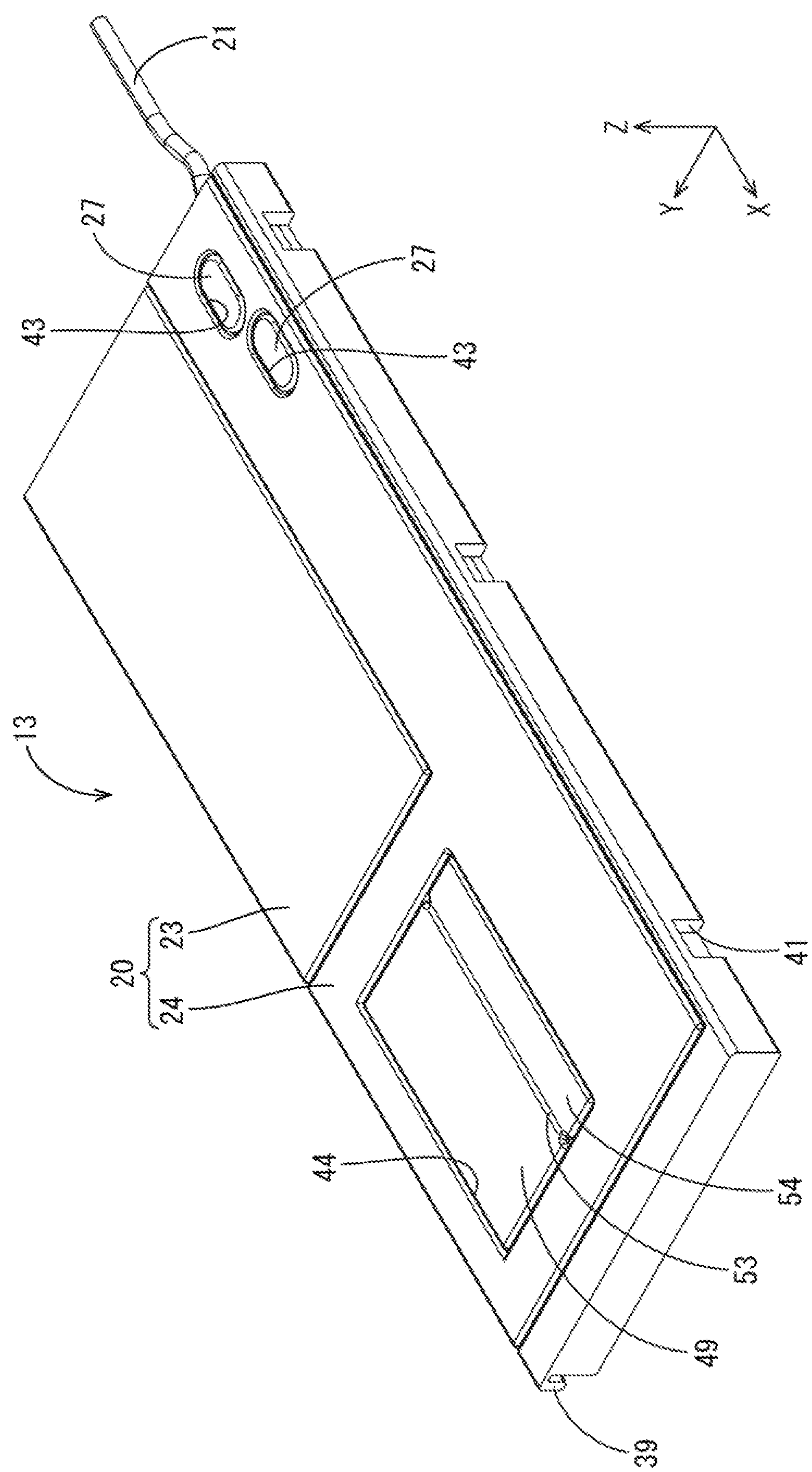
FIG. 4 is a perspective view illustrating the wiring module.

As illustrated in FIG. 4, the housing 20 has a flat plate shape with respect to the upper-bottom direction and has a rectangular shape seen from above. The housing 20 includes a lower housing 23 and an upper housing 24 that is mounted above the lower housing 23.

[Lower Housing 23]

Figure 5:
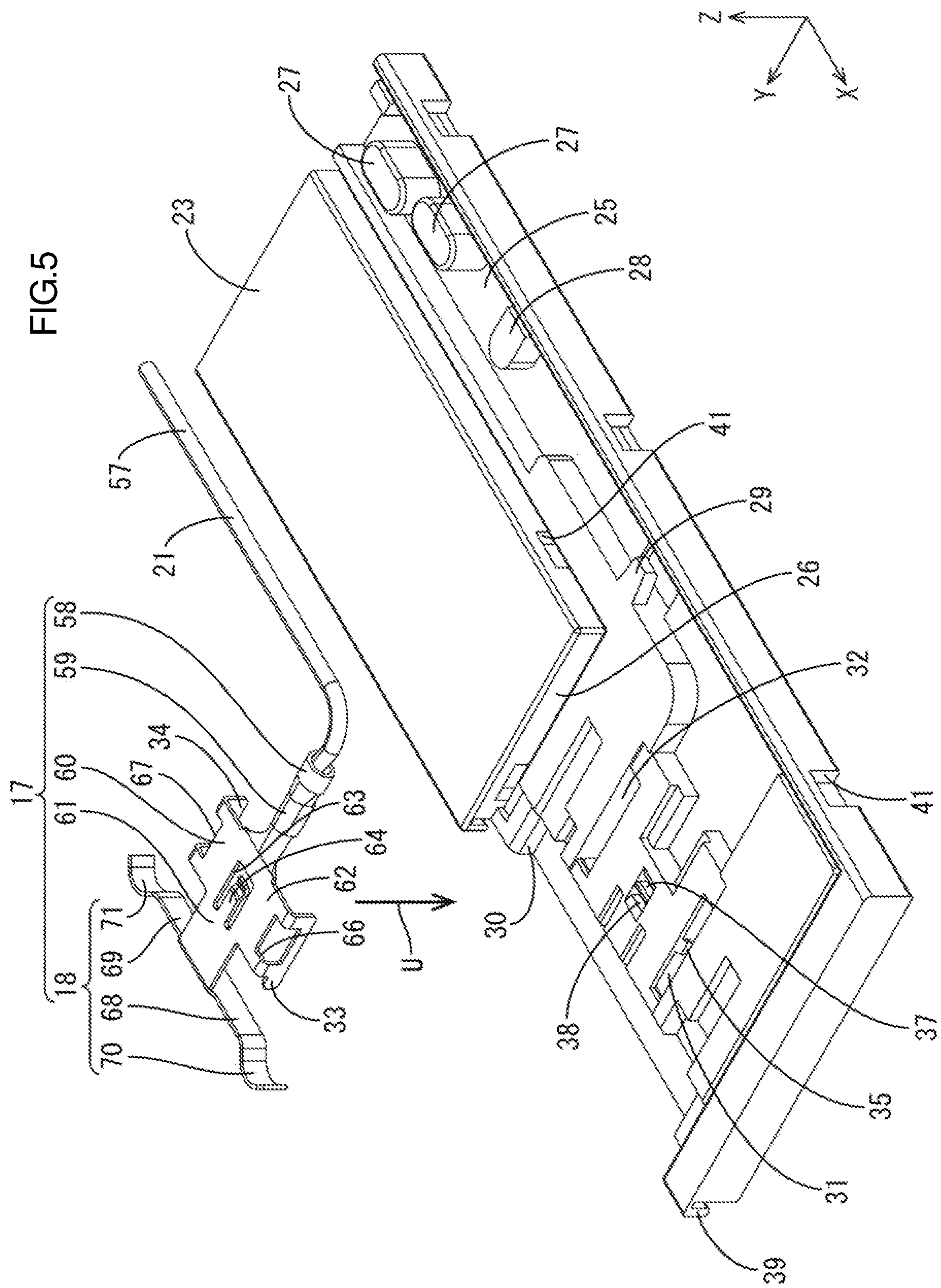
FIG. 5 is a perspective view illustrating a process of mounting a terminal on a lower housing.

As illustrated in FIG. 5, the lower housing 23 includes a wire groove 25 in a rear edge section thereof and a terminal housing section 26 in an area slightly smaller than a left half area. The wire groove 25 extends in the right-left direction and opens upward and rightward. The terminal housing section 26 extends in the front-rear direction and opens upward and frontward. The wire groove 25 is communicated with the terminal housing section 26 at the left end of the wire groove 25 and the rear end of the terminal housing section 26. The lower housing 23 includes the wire groove 25 that is recessed downward and the terminal housing section 26, and the wire groove 25 and the terminal housing section 26 form an about L-shape seen from above.

A pair of wire stoppers 27 projects upward from a bottom wall of the wire groove 25. The wire stoppers 27 are disposed closer to a right end of the wire groove 25 and are spaced away from each other with respect to the right-left direction. The wire stoppers 27 have a long circular column shape that is elongated in the right-left direction seen from above. The positions of the wire stoppers 27 are shifted from each other with respect to the front-rear direction. The electric wire 21 is disposed between the wire stoppers 27 such that tensile force can be received by the wire stoppers 27 if the tensile force acts on the electric wire 21. The electric wire 21 extends to the outside of the housing 20 from the right end of the wire groove 25.

A projection 28 projects upward from the bottom wall of the wire groove 25 and is on the left side with respect to the wire stoppers 27. The projection 28 projects frontward from a rear wall of the wire groove 25 and has a round front end surface. The front end of the projection 28 is away from a front wall of the wire groove 25 with a gap that is greater than a diameter of the electric wire 21.

A fitting projection 29 projects rearward from the front wall of the wire groove 25. The fitting projection 29 is disposed in a middle section with respect to the right-left direction. The rear end of the fitting projection 29 is away from the rear wall of the wire groove 25 with a gap that is greater than the diameter of the electric wire 21. The electric wire 21 is disposed in a space between the fitting projection 29 and the bottom wall of the wire groove 25.

The terminal housing section 26 includes a terminal window section 30 that opens frontward. The terminal housing section 26 includes a recessed portion behind the front edge of the terminal window section 30. The recessed portion is recessed downward and the elastic contact portion 18 of the terminal is movable with respect to the front-rear direction in the recessed portion.

The terminal housing section 26 includes a left guide recess 31 and a right guide recess 32 behind the terminal window section 30. The left guide recess 31 and the right guide recess 32 are away from each other with respect to the right-left direction and extend in the front-rear direction. The left guide recess 31 and the right guide recess 32 are recessed downward. A left guide piece 33 of the terminal 17 is to be fitted in the left guide recess 31 and a right guide piece 34 of the terminal 17 is to be fitted in the right guide recess 32.

A left side front stopper 35 (one example of a front stopper) projects leftward from a right wall of the left guide recess 31. The left side front stopper 35 is in a middle section of the right wall of the left guide recess 31 with respect to the front-rear direction. A right side front stopper (not illustrated) projects rightward from a left wall of the right guide recess 32. The right side front stopper is in a middle section of the left wall of the right guide recess 32 with respect to the front-rear direction.

The lower housing 23 includes a standby position stopper 37 and a contact position stopper 38 between the left guide recess 31 and the right guide recess 32. The standby position stopper 37 and the contact position stopper 38 are recessed downward and the contact position stopper 38 is in front of the standby position stopper 37. The opening edges of the standby position stopper 37 and the contact position stopper 38 are chamfered.

The lower housing 23 includes a lower-side fitting portion 39 at the front edge thereof. The lower-side fitting portion 39 extends frontward from an upper end of the front edge and is curved downward. The lower-side fitting portion 39 has a hooked shape that is bent downward seen from the right-left direction.

[Upper Housing 24]

The upper housing 24 is mounted on the lower housing 23 to cover the terminal housing section 26 and the wire groove 25 in the lower housing 23. The outline of the upper housing 24 matches the outline of the terminal housing section 26 and the wire groove 25 and is an about L-shape (refer to FIG. 4).

Locking portions 40 project outward from the edge of the upper housing 24. The lower housing 23 includes receiving portions 41 at positions corresponding to the locking portions 40 and the receiving portions 41 are recesses. The locking portions 40 are elastically fitted to the receiving portions 41 and accordingly, the upper housing 24 and the lower housing 23 are coupled together as a unit (refer to FIG. 3).

As illustrated in FIG. 3, the upper housing 24 includes an upper-side fitting portion 42 at the front edge thereof. The upper-side fitting portion 42 extends frontward from an upper end of the front edge and is curved downward. The upper-side fitting portion 42 has a hooked shape that is bent downward seen from the right-left direction.

As illustrated in FIG. 4, the upper housing 24 includes a pair of through holes 43 at positions corresponding to the wire stoppers 27 of the lower housing 23. The through holes 43 are same as or slightly greater in size than the outline of the wire stoppers 27. When the upper housing 24 and the lower housing 23 are coupled together, the wire stoppers are fitted in the respective through holes 43. This suppresses the contact between the wire stoppers 27 and the upper housing 24. Furthermore, when the upper housing 24 and the lower housing 23 are coupled together, the upper surfaces of the wire stoppers 27 are on the same plane as the upper surface of the upper housing 24. According to such a configuration, the upper portions of the wire stoppers 27 do not project upward than the upper surface of the upper housing 24.

Figure 6:
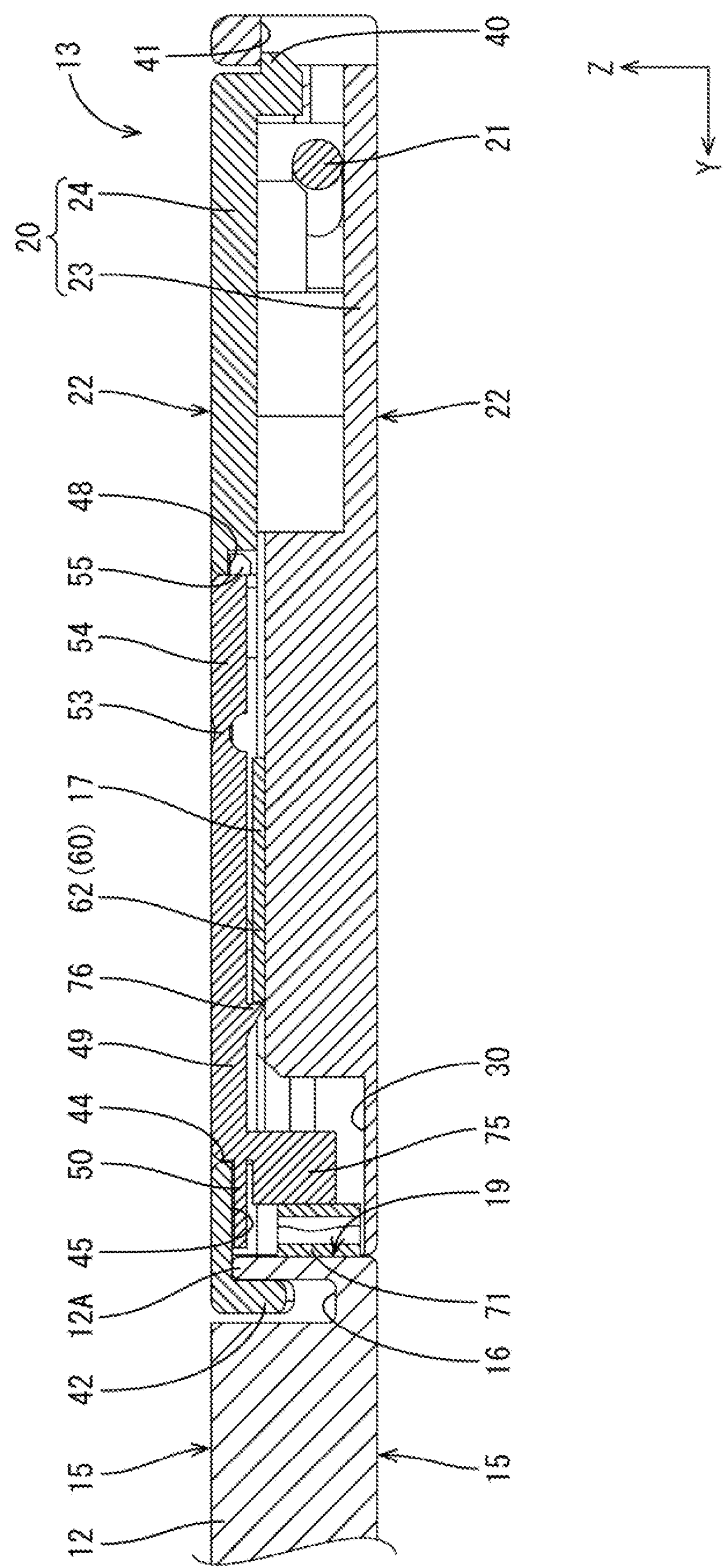
FIG. 6 is a cross-sectional view taken along VI-VI line in FIG. 18.

As illustrated in FIG. 4, the upper housing 24 includes a window hole 44 at a position corresponding to the terminal housing section 26. The window hole 44 has a rectangular shape seen from above. The hole edge section around the window hole 44 includes a front hole edge section, a left hole edge section, and a right hole edge section. The front hole edge section, the left hole edge section, and the right hole edge section include a front flange receiving section 45, a left flange receiving section (not illustrated), and a right flange receiving section (not illustrated) on the lower surfaces of the edge sections, respectively. As illustrated in FIG. 6, a cover lock receiving portion 48 is recessed upward in the lower surface of a rear hole edge section of the window hole 44.

[Terminal Cover 49]

As illustrated in FIG. 4, a terminal cover 49 is mounted in the window hole 44 of the upper housing 24 so as to be movable in the front-rear direction. The terminal cover 49 is made of insulating synthetic resin with injection molding.

Figure 7:
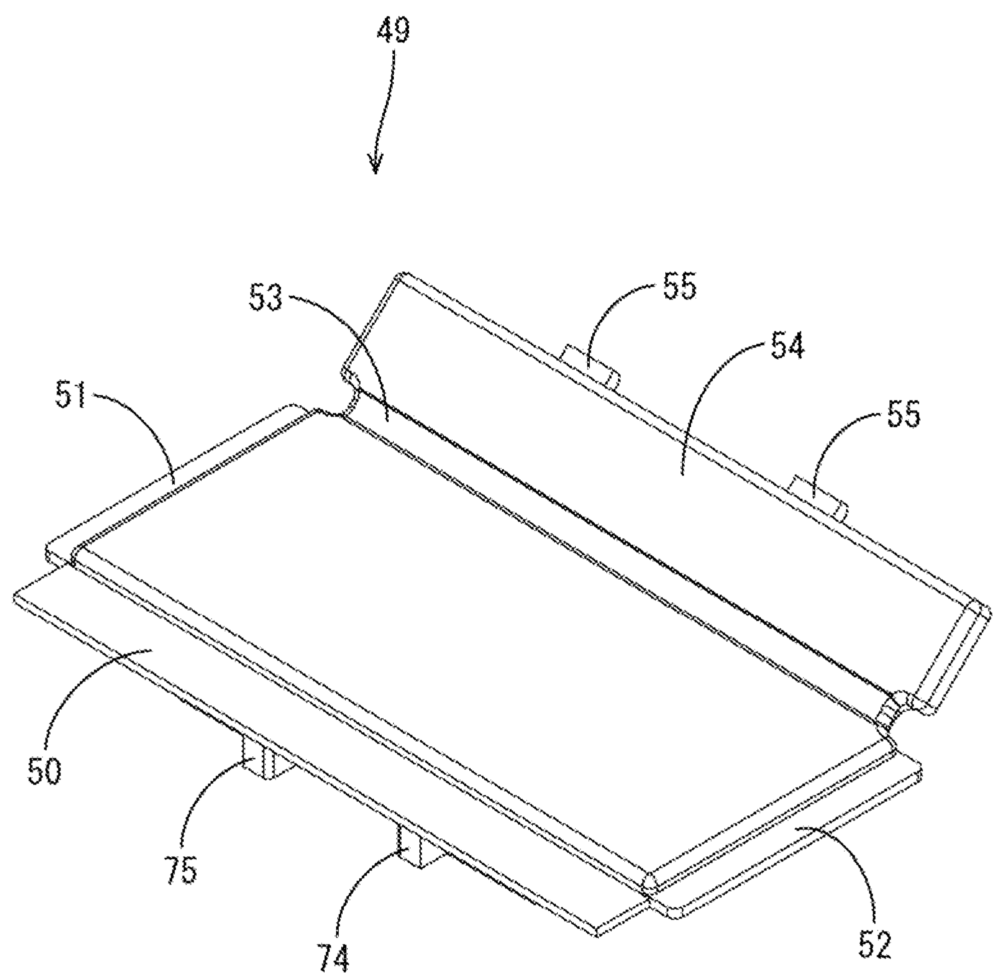
FIG. 7 is a perspective view illustrating a terminal cover.
Figure 7:
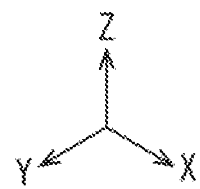

As illustrated in FIG. 7, the terminal cover 49 has a rectangular shape that is slightly greater than the window hole 44 of the upper housing 24 seen from above. The terminal cover 49 includes a front flange 50 projecting frontward from a front edge of the terminal cover 49, a left flange 51 projecting leftward from a left edge thereof, and a right flange 52 projecting rightward from a right edge thereof. The front flange 50, the left flange 51, and the right flange 52 are at a lower level than the upper surface of the terminal cover 49. When the terminal cover 49 is mounted in the window hole 44 of the upper housing 24, the front flange 50 is received by the front flange receiving section 45, the left flange 51 is received by the left flange receiving section, and the right flange 52 is received by the right flange receiving section.

As illustrated in FIG. 7, the terminal cover 49 integrally includes a hinge 53 in front of the rear edge of the terminal cover 49. The hinge 53 extends along the right-left direction. The hinge 53 is thinner than other sections of the terminal cover 49 other than the hinge 53. The rear section of the terminal cover 49 that is behind the hinge 53 is a cover section 54. The cover section 54 is pivotable around the hinge 53.

As illustrated in FIG. 7, two locking portions 55 project rearward from the rear edge of the cover section 54. The two locking portions 55 are away from each other with respect to the right-left direction. By pivoting the cover section 54 around the hinge 53 after the terminal cover 49 is attached to the upper housing 24, the cover locking portions 55 are fitted to the cover lock receiving portion 48 with the window hole 44 of the upper housing 24 being covered with the terminal cover 49. Accordingly, the cover section 54 is held in a closed state.

[Terminal 17]

As illustrated in FIG. 5, the terminal 17 is connected to one end of an electric wire 21 that is routed in the wire groove 25 of the lower housing 23. The electric wire 21 includes a core wire (not illustrated) that is made of electrically conductive metal and an insulating sheath 57 that covers an outer surface of the core wire. The insulating sheath 57 is made of synthetic resin having insulating properties. At the end of the electric wire 21, the insulating sheath 57 is ripped and a section of the core wire is exposed. The other end of the electric wire 21 is connected to an electronic control unit (ECU), which is not illustrated.

The metal of which the core wire is made may be selected from any kinds of meatal including copper, copper alloy, aluminum, and aluminum alloy where appropriate. A twisted wire including multiple metal fine wires that are twisted together or a single core wire including only one metal wire may be used for the core wire. In this embodiment, the twisted wire is used for the core wire.

Figure 8:
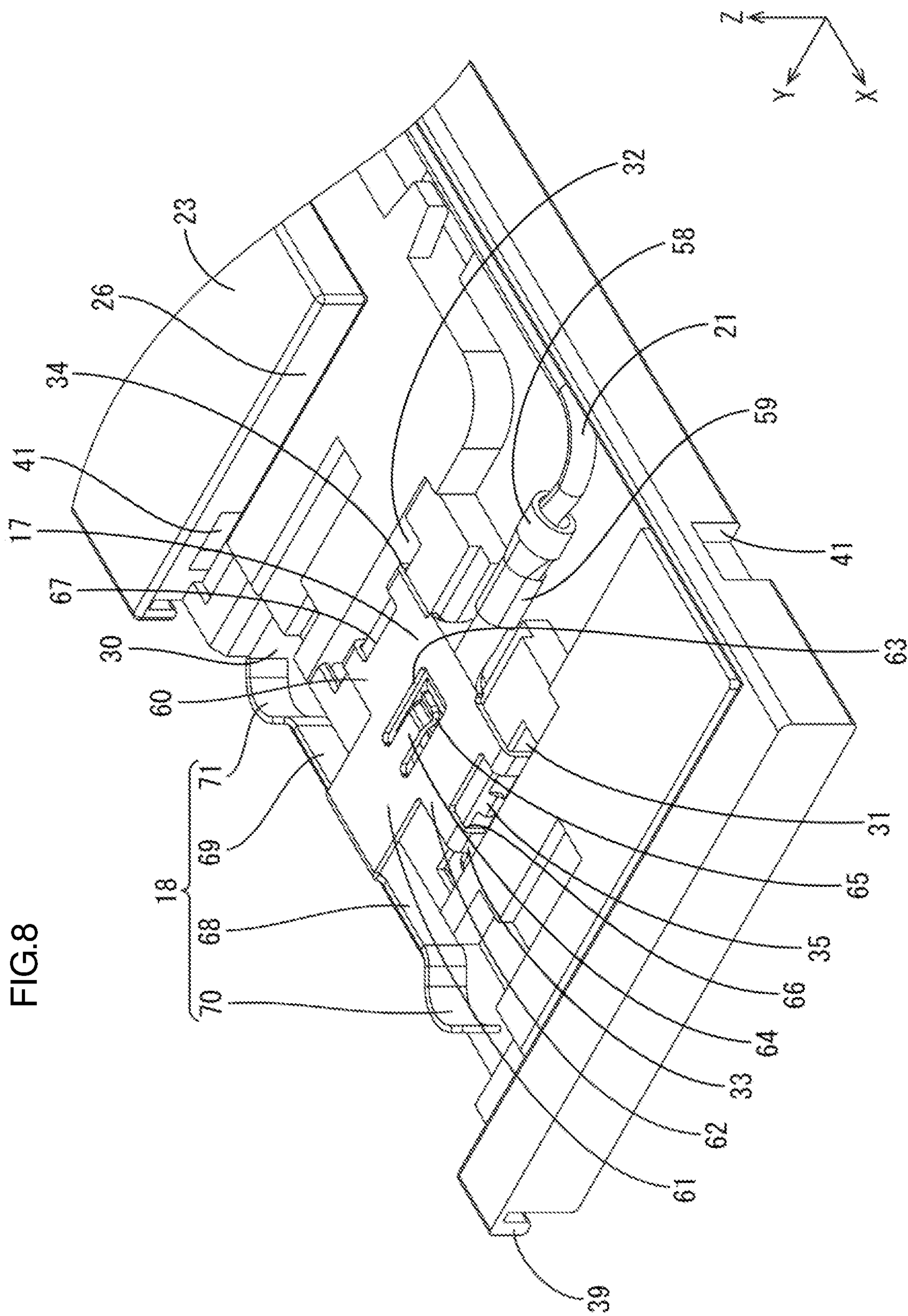
FIG. 8 is a partial enlarged perspective view illustrating the lower housing in which the terminal is held in a standby position.

As illustrated in FIG. 8, the terminal 17 is made by pressing an electrically conductive plate into a predefined shape. The terminal 17 includes an insulation barrel 58, a wire barrel 59, a fitting plate portion 60 connection portion 61, and the elastic contact portion 18. The insulation barrel 58 is crimped onto the outer surface of the insulating sheath 57 of the electric wire 21. The wire barrel 59 is in front of the insulation barrel 58 and is crimped onto the outer surface of the core wire that is exposed from the end of the insulating sheath 57. The fitting plate portion 60 extends frontward from the wire barrel 59. The connection portion 61 extends frontward from the front edge of the fitting plate portion 60. The elastic contact portion 18 is at the front end of the connection portion 61.

The fitting plate portion 60 includes an upper plate section 62, the left guide piece 33 extending downward from a left edge of the upper plate section 62, and the right guide piece 34 extending downward from a right edge of the upper plate section 62.

As illustrated in FIG. 8, the upper plate section 62 includes a U-shaped slit 63 at a middle position thereof with respect to the right-left direction. The U-shaped slit 63 is elongated in the front-rear direction. By forming the U-shaped slit 63, an elastic fitting piece 64 is formed in the upper plate section 62. The elastic fitting piece 64 extends rearward from a position near the front edge of the upper plate section 62. The elastic fitting piece 64 has a long rectangular shape extending in the front-rear direction seen from above. The elastic fitting piece 64 is elastically deformable with respect to the upper-bottom direction. The elastic fitting piece 64 includes a fitting projection 65 at a position near the rear edge of the elastic fitting piece 64. The fitting projection 65 projects downward. With the fitting projection 65 being fitted in the standby position stopper 37 of the lower housing 23, the terminal 17 is held in the standby position. With the fitting projection 65 being fitted in a connection position holder, the terminal 17 is held in a connected position.

The fitting plate portion 60 includes a left fitting hole 66 and a right fitting hole 67 on a left edge section and a right edge section of the fitting plate portion 60, respectively. The left fitting hole 66 extends from the left edge section of the upper plate section 62 to the upper edge section of the left guide piece 33. The right fitting hole 67 extends from the right edge section of the upper plate section 62 to the upper edge section of the right guide piece 34.

The connection portion 61 extends frontward from the front edge of the upper plate section 62. The connection portion 61 extends from a middle section of the front edge of the upper plate section 62 with respect to the right-left direction. The connection portion 61 has a rectangular shape seen from above. A width dimension of the connection portion 61 with respect to the right-left direction is about one third of a width dimension of the upper plate section 62 with respect to the right-left direction.

The elastic contact portion 18 that is at the front edge of the connection portion 61 includes a left elastic piece 68 and a right elastic piece 69. The left elastic piece 68 extends leftward from the front edge of the connection portion 61 and the right elastic piece 69 extends rightward from the front edge of the connection portion 61. The left elastic piece 68 and the right elastic piece 69 are symmetrical.

The left elastic piece 68 is disposed such that plate surfaces of the left elastic piece 68 face the front and rear sides, respectively. The left elastic piece 68 is elastically deformable in the front-rear direction. A left contact portion 70 is on the left side of the left elastic piece 68 and the left contact portion 70 projects frontward.

The right elastic piece 69 is disposed such that plate surfaces of the right elastic piece 69 face the front and rear sides, respectively. The right elastic piece 69 is elastically deformable in the front-rear direction. A right contact portion 71 is on the right side of the right elastic piece 69 and the right contact portion 71 projects frontward.

With the left contact portion 70 and the right contact portion 71 being elastically contacted with the terminal contact surface 19 of the conductive member 12 from the rear side, the conductive member 12 and the terminal 17 are electrically connected to each other. Accordingly, the voltage of the electrode surfaces 14A, 14B of the power storage element 11 can be detected with the terminal 17 via the conductive member 12.

[Fitting Structure of Terminal 17 and Housing 20]

As indicated by the arrow U in FIG. 5, the terminal 17 is fitted to the lower housing 23 from above with the left guide piece 33 and the right guide piece 34 directing downward. The left guide piece 33 is inserted in the left guide recess 31 and the right guide piece 34 is inserted in the right guide recces 32. The left side front stopper 35 of the left guide recess 31 is fitted in the left fitting hole 66 of the left guide piece 33 and the right side front stopper of the right guide recess 32 is fitted in the right fitting hole 67 of the right guide piece 34.

Figure 9:
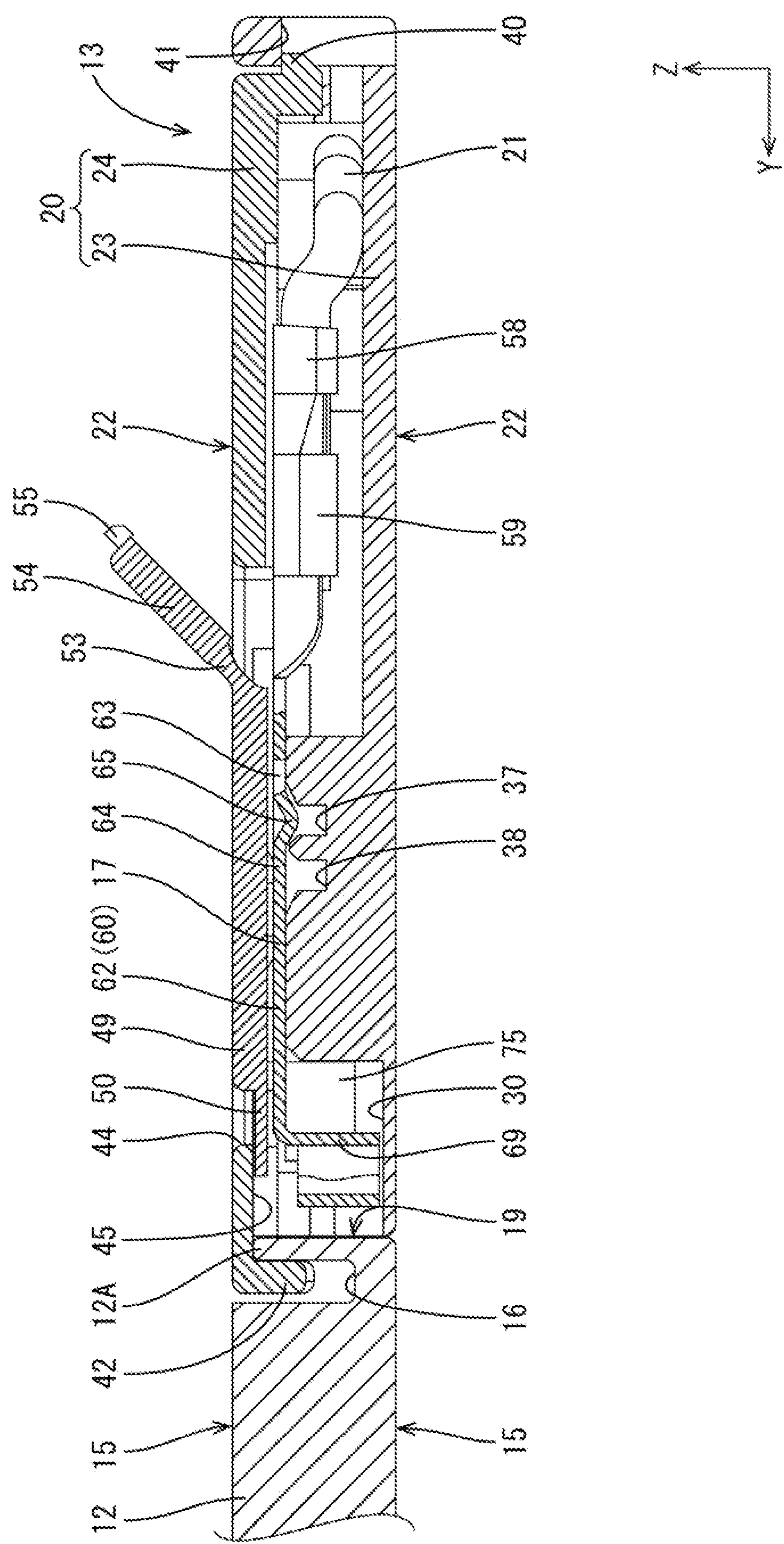
FIG. 9 is a cross-sectional view taken along IX-IX line in FIG. 11.

As illustrated in FIG. 9, the fitting projection 65 of the elastic fitting piece 64 included in the upper plate section 62 of the terminal 17 is fitted in the standby position stopper 37 of the lower housing 23. Accordingly, the terminal 17 is held by the standby position stopper 37.

Figure 10:
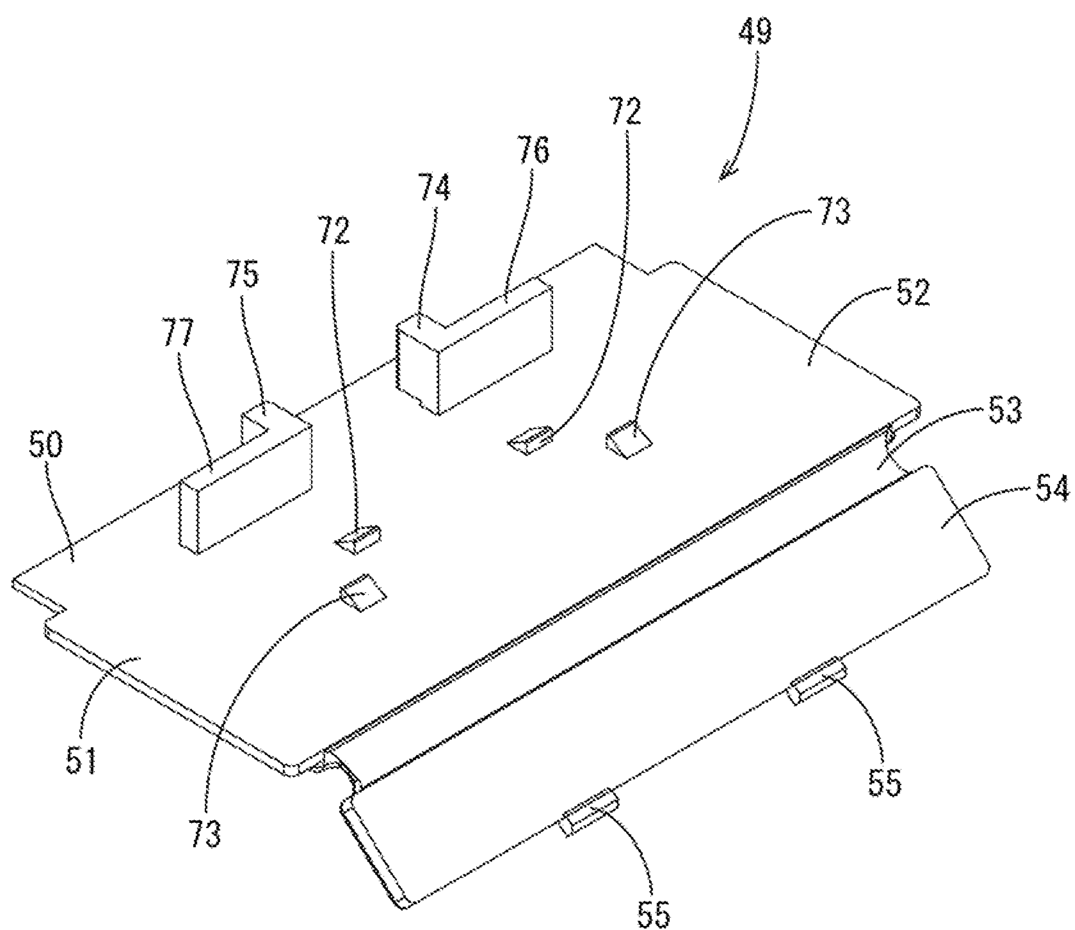
FIG. 10 is a perspective view illustrating the terminal cover seen from a different point of view from that in FIG. 7.
Figure 11:
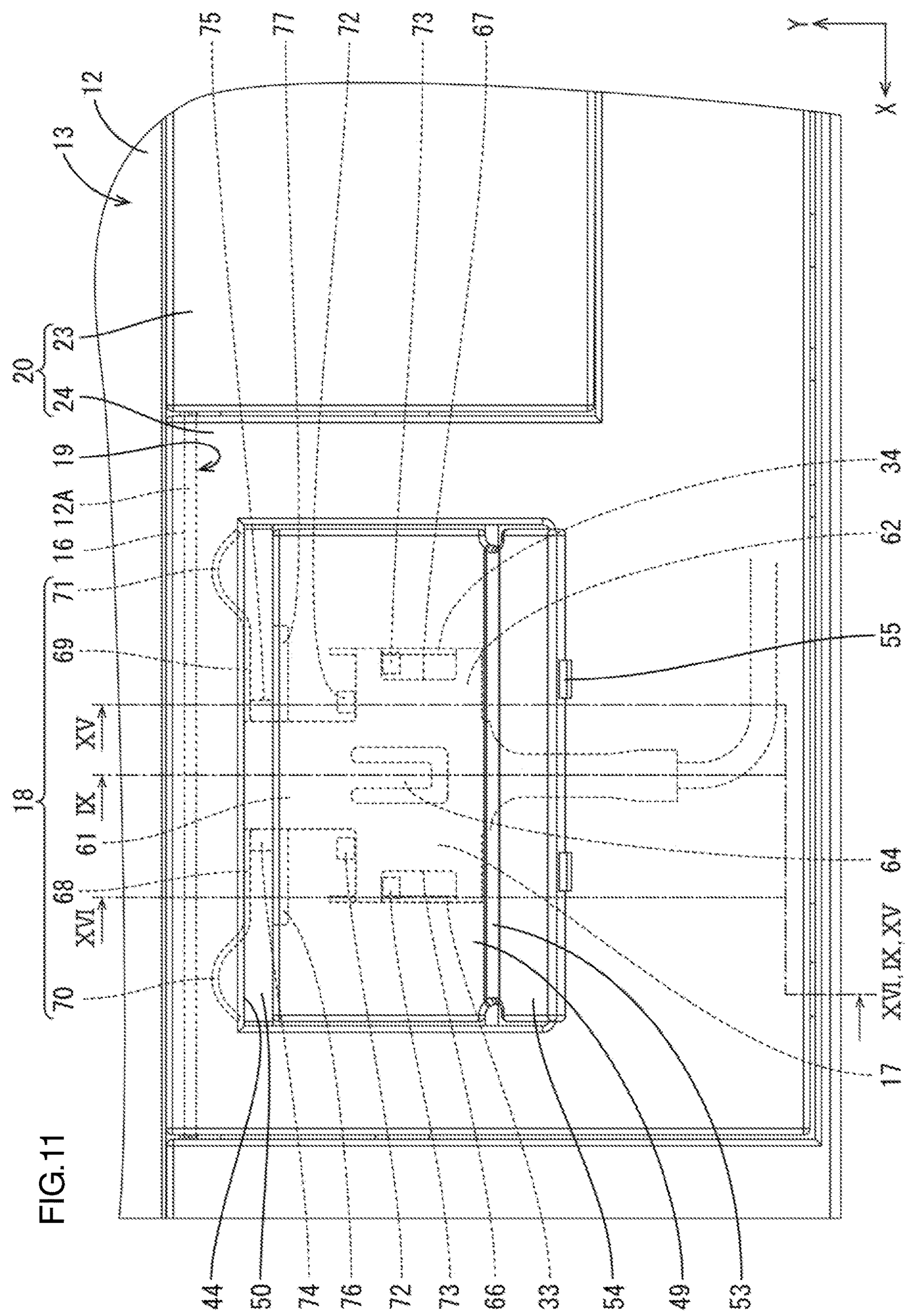
FIG. 11 is a partial enlarged plan view illustrating the housing in which the terminal cover is held in a temporary holding position.

As illustrated in FIG. 10, two first holders 72 project downward from the lower surface of the terminal cover 49. The first holders 72 come in contact with the front edge of the upper plate section 62 of the fitting plate portion 60 from the front side. The two first holders 72 are away from each other with respect to the right-left direction. A space between the two first holders 72 is greater than the width of the connection portion 61 with respect to the right-left direction. The connection portion 61 is disposed between the two first holders 72 (refer to FIG. 11).

As illustrated in FIG. 10, two second holders 73 project downward from the lower surface of the terminal cover 49. The second holders 73 come in contact with the front edges of the right fitting hole 67 and the left fitting hole 66, which are formed in the upper plate section 62 of the fitting plate portion 60, from the rear side, respectively. The second holders 73 are disposed in the left fitting hole 66 and the right fitting hole 67, respectively (refer to FIG. 11).

As illustrated in FIG. 10, a left pushing portion 74 and a right pushing portion 75 project downward from the lower surface of a front edge section of the terminal cover 49. The left pushing portion 74 and the right pushing portion 75 are away from each other with respect to the right-left direction. A space between the left pushing portion 74 and the right pushing portion 75 with respect to the right-left direction is same as or greater than the dimension of the connection portion 61 measured in the right-left direction. The connection portion 61 is disposed between the left pushing portion 74 and the right pushing portion 75 (refer to FIG. 11).

As illustrated in FIG. 10, a left reinforcing portion 76 projects downward from the lower surface of the terminal cover 49. The left reinforcing portion 76 extends leftward from the rear end of the left pushing portion 74. A right reinforcing portion 77 projects downward from the lower surface of the terminal cover 49. The right reinforcing portion 77 extends rightward from the rear end of the right pushing portion 75.

Assembling Process of this Embodiment

Next, one example of the process of assembling the power storage module 10 will be described. However, the process of assembling the power storage module 10 is not limited to the method described below.

The core wire is exposed at the end of the electric wire 21 by striping the section of the insulating sheath 57.

The terminal 17 is formed by pressing a metal plate into a predefined shape. The insulation barrel 58 is crimped onto the outer surface of the insulating sheath 57. The wire barrel 59 is crimped onto the outer surface of the core wire. This establishes electric connection between the electric wire 21 and the terminal 17.

The lower housing 23, the upper housing 24, and the terminal cover 49 are formed with injection molding with using insulating synthetic resin. As illustrated in FIG. 5, the terminal 17 is arranged in the terminal housing section 26 of the lower housing 23 from above (the direction indicated by the arrow U) and the electric wire 21 is arranged in the wire groove 25 from above.

The electric wire 21 is disposed below the fitting projection 29 in the wire groove 25. This holds the electric wire 21 within the wire groove 25 so as not to move upward. Furthermore, the electric wire 21 is sandwiched between the wire stoppers 27. This holds the electric wire 21 within the wire groove 25 so as not to move rightward.

Figure 12:
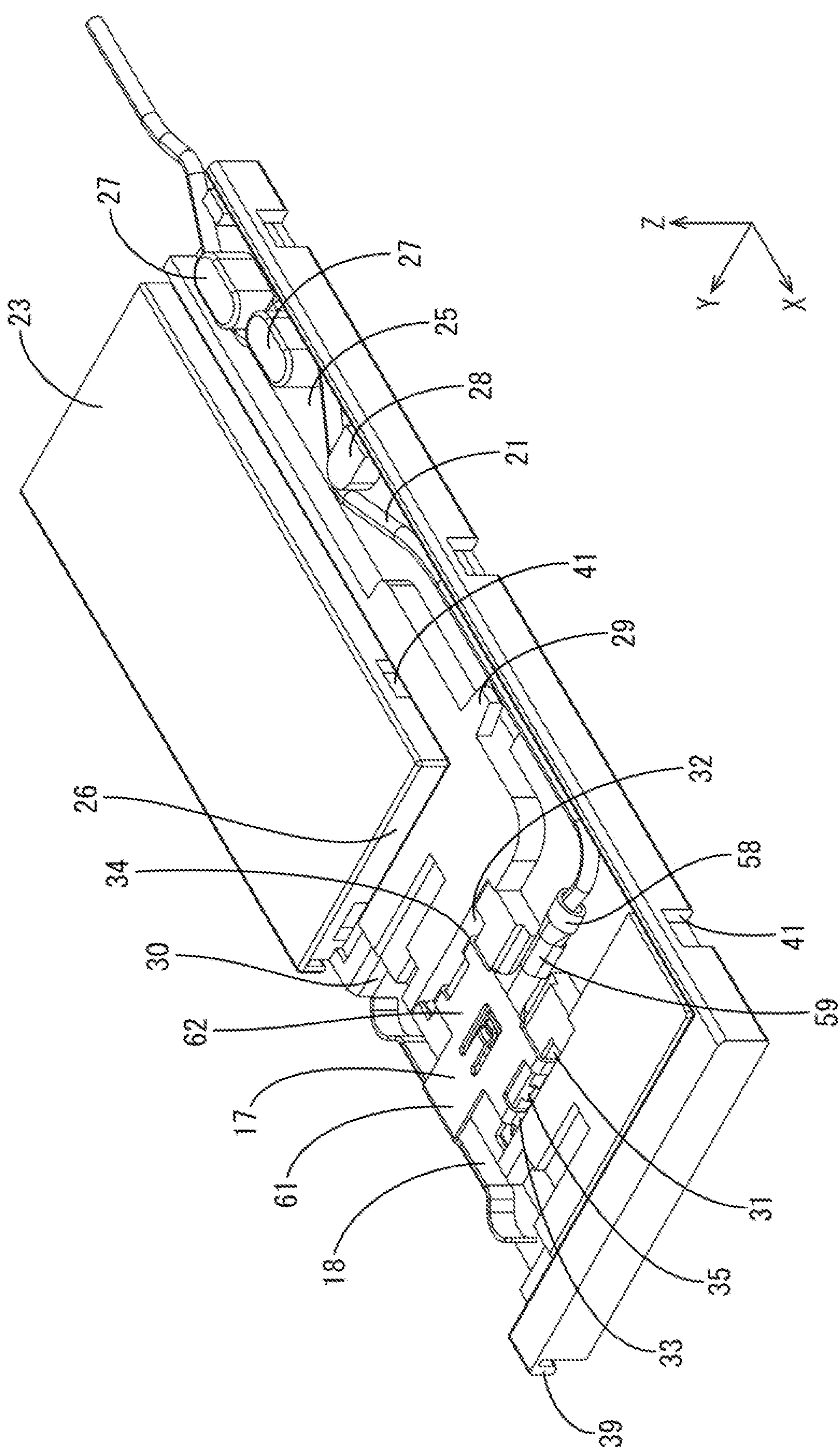
FIG. 12 is a perspective view illustrating the lower housing in which the terminal is fitted.

As illustrated in FIG. 12, the left guide piece 33 of the terminal 17 is inserted in the left guide recess 31 of the lower housing 23 from above and the right guide piece 34 of the terminal 17 is inserted in the right guide recess 32 of the lower housing 23 from above. The lower edge of the left guide piece 33 comes in contact with the left side front stopper 35 of the left guide recess 31 from above and the lower edge of the right guide piece 34 comes in contact with the right side front stopper of the right guide recess 32 from above. Accordingly, the left guide piece 33 and the right guide piece 34 are deformed to increase a distance therebetween with respect to the right-left direction.

As the terminal 17 is further pushed downward, the left guide piece 33 and the right guide piece 34 are deformed to restore their original shapes. Then, the left side front stopper 35 is fitted in the left fitting hole 66 and the right side front stopper is fitted in the right fitting hole 67.

With the fitting projection 65 of the terminal 17 being fitted in the standby position stopper 37 of the lower housing 23, the terminal 17 is held in the standby position with respect to the lower housing 23.

Figure 13:
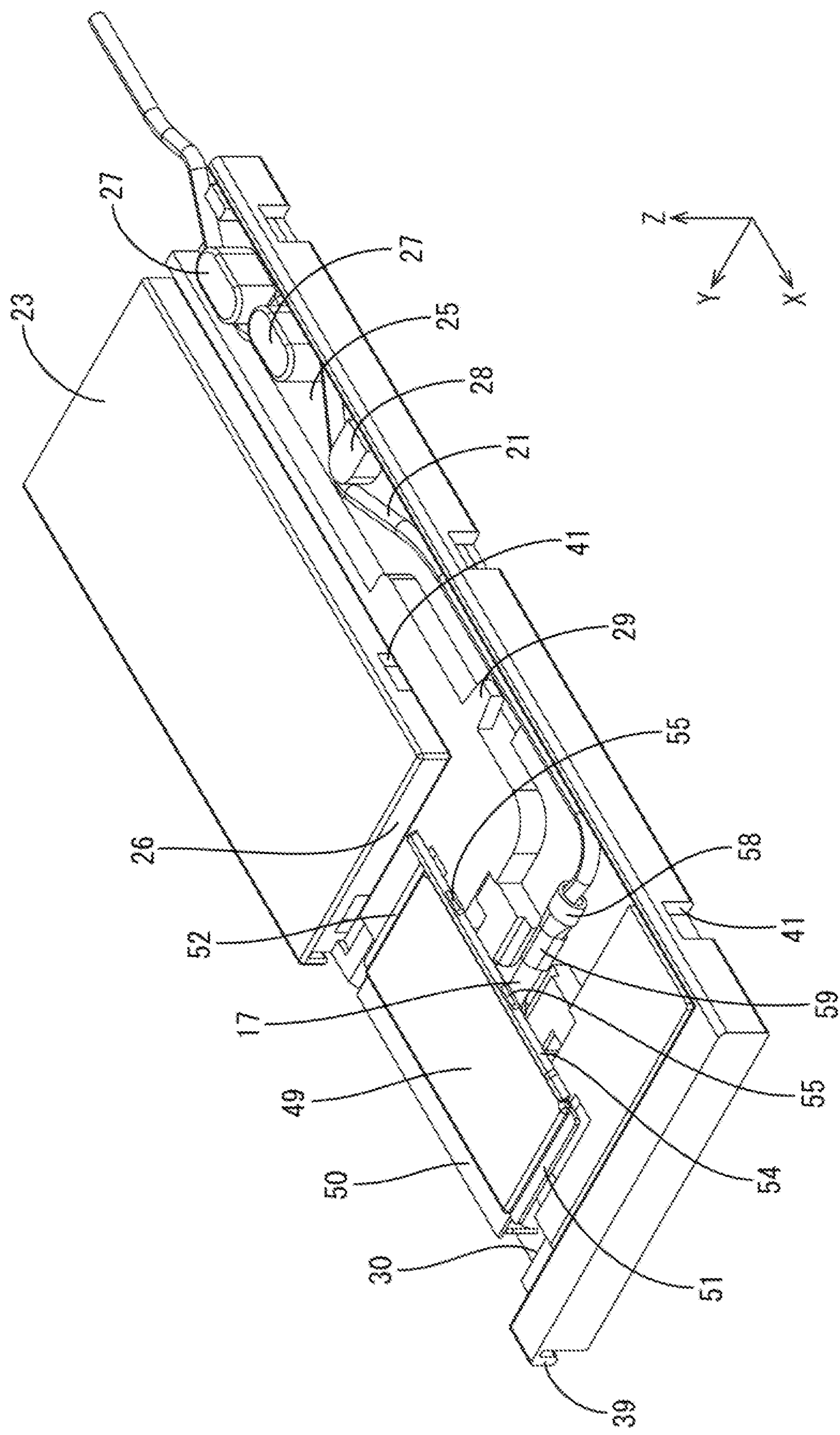
FIG. 13 is a perspective view illustrating the terminal cover that is attached to the terminal.

As illustrated in FIG. 13, the terminal cover 49 is mounted on the terminal 17 from above. The terminal cover 49 is mounted on the terminal 17 such that the connection portion 61 is between the left pushing portion 74 and the right pushing portion 75, which are on the lower surface of the terminal cover 49, and between the two first holders 72. The two second holders 73 of the terminal cover 49 are disposed in the left fitting hole 66 and the right fitting hole 67 of the terminal 17, respectively. With the right reinforcing portion 76 and the right reinforcing portion 77 coming in contact with the rear edge section of the terminal window section 30 from the front side, the terminal 17 is less likely to move rearward (refer to FIG. 11).

Figure 14:
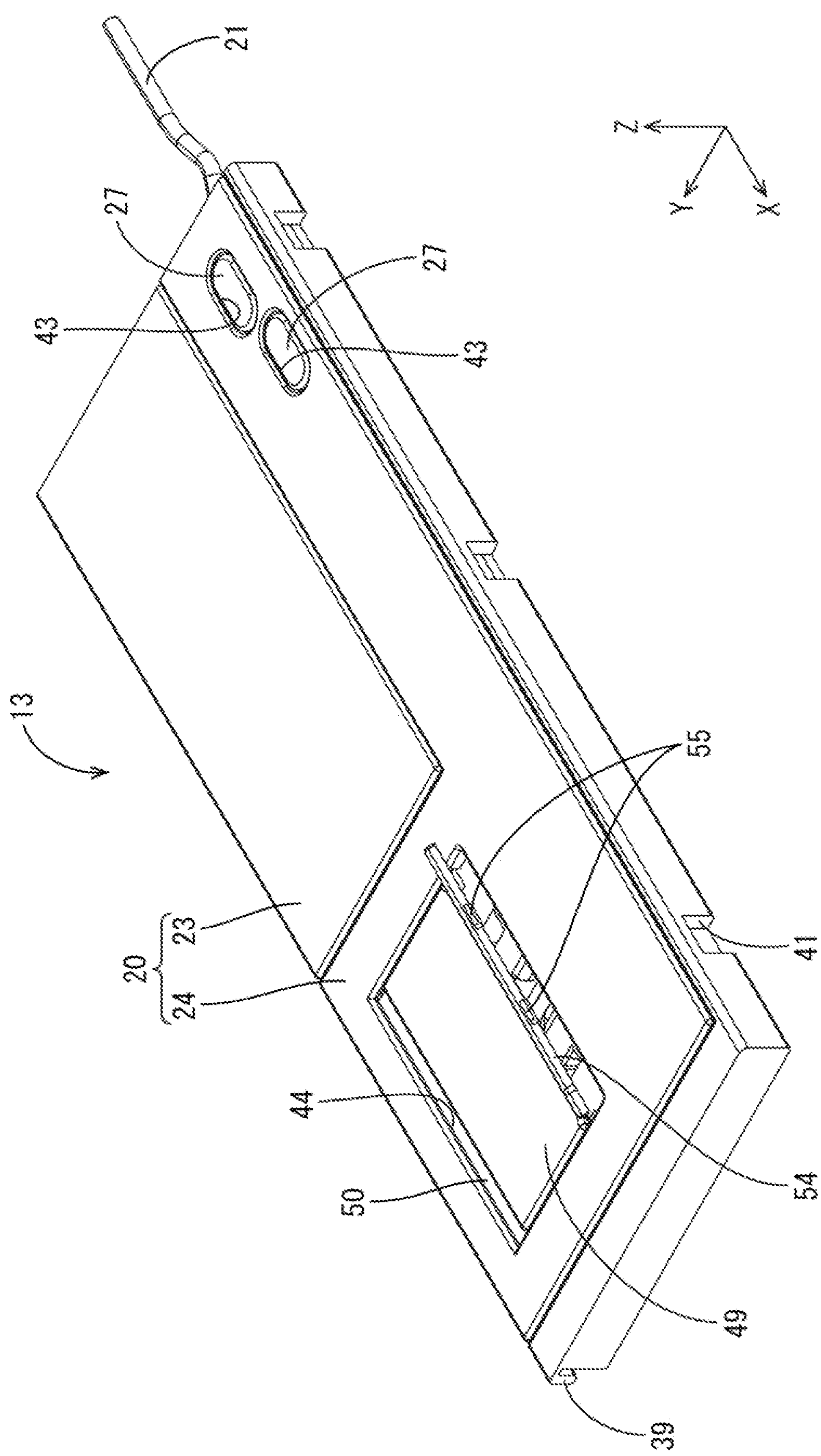
FIG. 14 is a perspective view illustrating the upper housing and the lower housing that are coupled together and the terminal cover that is held in the temporary holding position.

As illustrated in FIG. 14, the upper housing 24 is mounted on the lower housing 23 from above. With the locking portions 40 included in the upper housing 24 and the lock receiving portions 41 included in the lower housing 23 being elastically fitted together, the upper housing 24 and the lower housing 23 are integrally coupled together.

As illustrated in FIG. 9, the terminal cover 49 is arranged within the window hole 44 of the upper housing 24. The front flange 50, the left flange 51, and the right flange 52 of the terminal cover 49 are received by the front flange receiving section 45, the left flange receiving section, and the right flange receiving section of the hole edge of the window hole 44, respectively. The terminal cover 49 is held by the upper housing 24 so as not to move upward. The terminal cover 49 is mounted on the terminal 17 that is held in the standby position with respect to the lower housing 23 and the terminal cover 49 is held in a temporary holding position with respect to the upper housing 24.

As illustrated in FIG. 9, when the terminal cover 49 is held in the temporary holding position with respect to the upper housing 24, the elastic contact portion 18 is behind the front edge of the lower housing 23. More in detail, the front edge of the left contact portion 70 and the front edge of the right contact portion 71 are on the rear side with respect to the front edge of the lower housing 23. According to such a configuration, the left contact portion 70 and the right contact portion 71 are less likely to be contacted with foreign obstacles and therefore the elastic contact portion 18 is less likely to be deformed.

Figure 15:
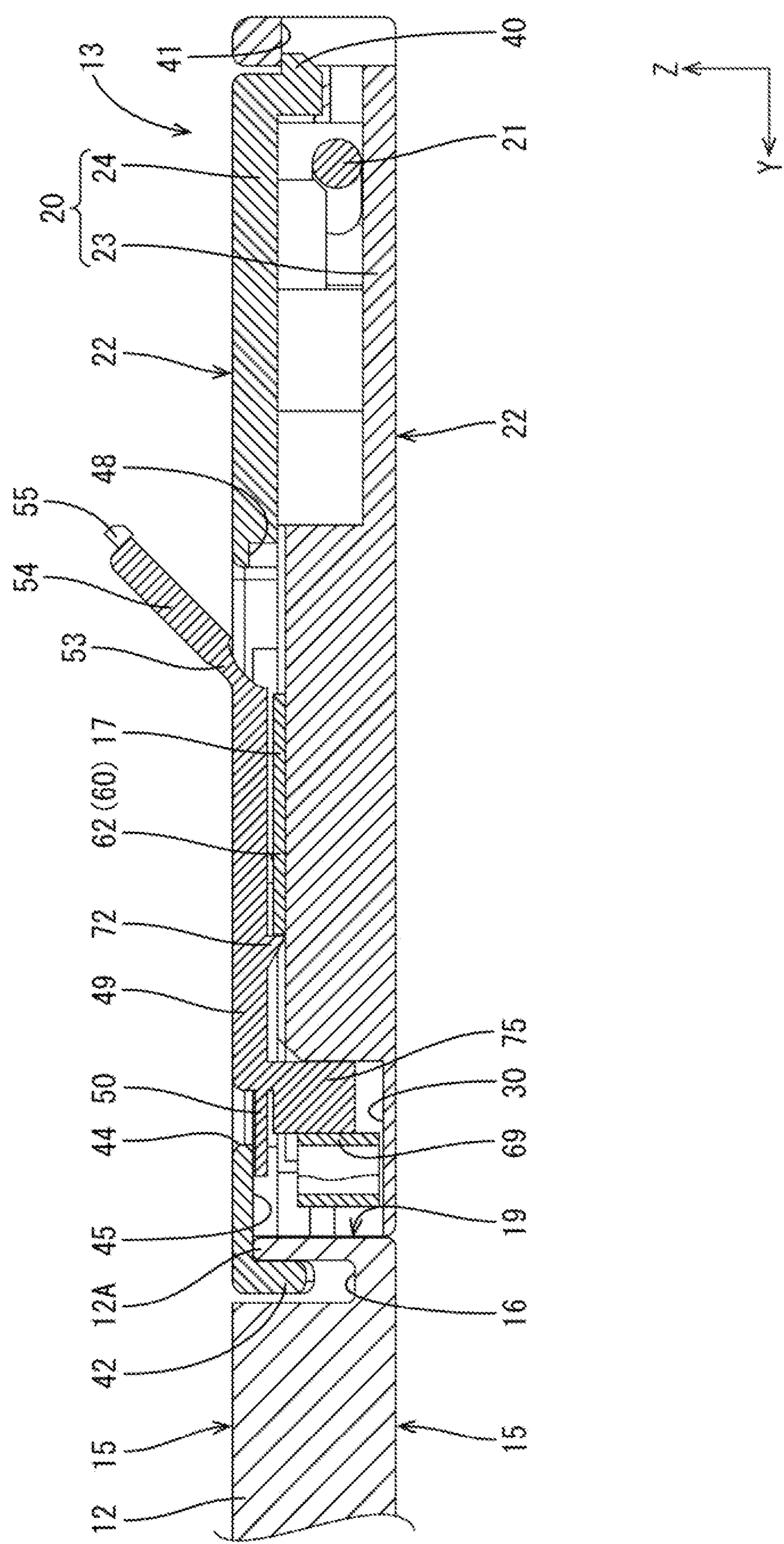
FIG. 15 is a cross-sectional view taken along XV-XV line in FIG. 11.
Figure 16:
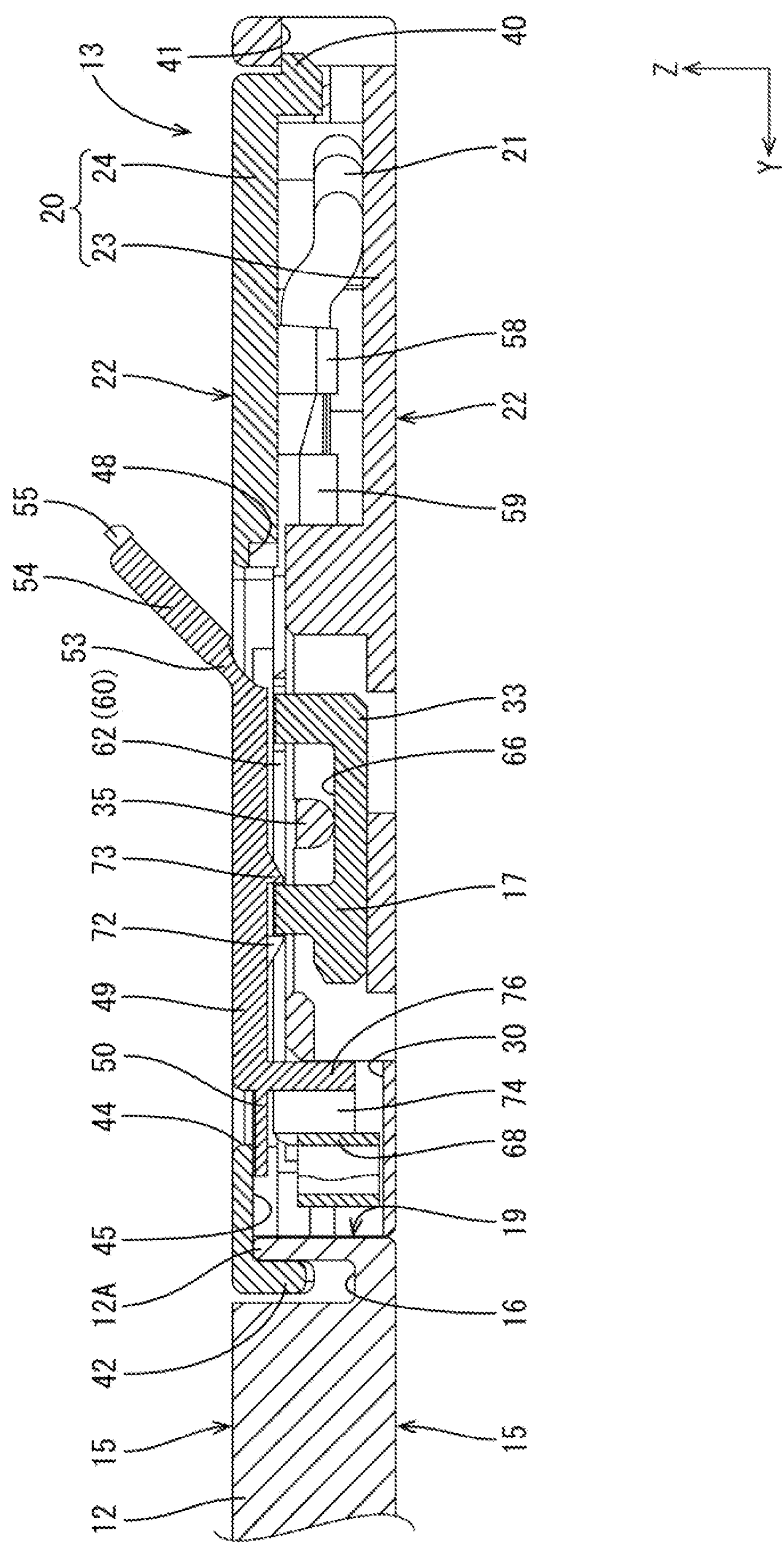
FIG. 16 is a cross-sectional view taken along XVI-XVI line in FIG. 11.
Figure 17:
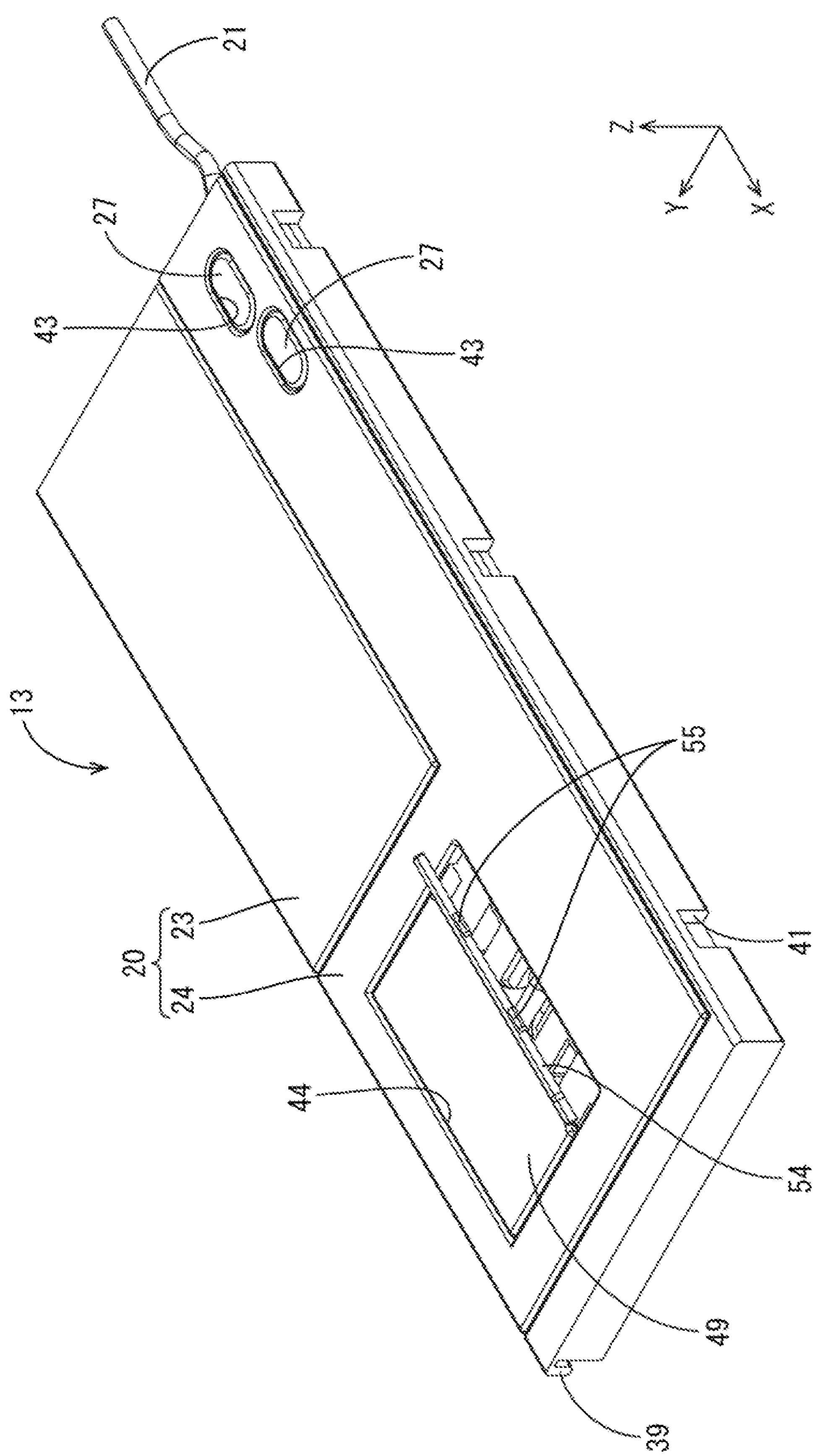
FIG. 17 is a perspective view illustrating the terminal cover that is held in the holding position.
Figure 18:
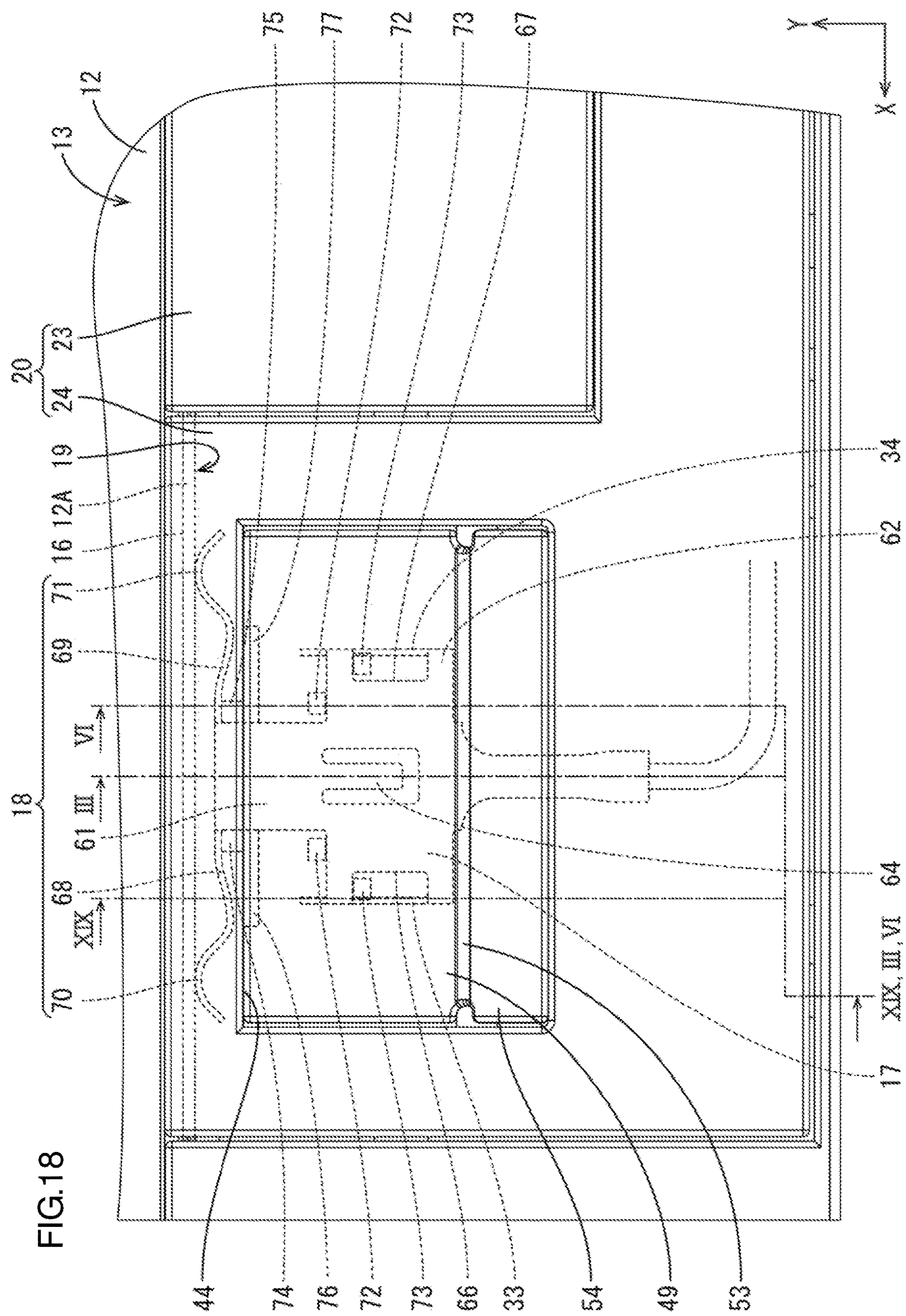
FIG. 18 is a partial enlarged view illustrating the wiring module.

When the terminal cover 49 is held in the temporary holding position with respect to the upper housing 24, as illustrated in FIG. 15, the first holders 72 are in contact with the front edge of the upper plate section 62 from the front side. As illustrated in FIG. 16, the second holders 73 are in contact with the front hole edges of the left fitting hole 66 and the right fitting hole 67 in the upper plate section 62 from the rear side. The left side front stopper 35 is fitted in the left fitting hole 66 and the right side front stopper is fitted in the right fitting hole 67.

Even if the cover section 54 is pivoted around the hinge 53 with the terminal cover 49 being held in the temporary holding position with respect to the upper housing 24, the rear edge of the cover section 54 hits the rear opening edge of the window hole 44 so as not to close the window hole 44 of the upper housing 24.

As illustrated in FIG. 9, with the lower-side fitting portion 39 and the upper-side fitting portion 42 of the wiring module 13 being fitted in the groove 16 of the conductive member 12 from above, the conductive member 12 and the wiring module 13 are coupled together. When the lower-side fitting portion 39 and the upper-side fitting portion 42 are fitted in the groove 16, the lower ends of lower-side fitting portion 39 and the upper-side fitting portion 42 are away from the bottom surface of the groove 16.

The terminal cover 49 that is held in the temporary holding position with respect to the lower housing 23 is pushed forward. Accordingly, the second holders 73 of the terminal cover 49 push the front opening edges of the left fitting hole 66 and the right fitting hole 67 in the upper plate section 62 from the rear side. This moves the terminal 17 forward. According to the forward movement of the terminal 17, the elastic fitting piece 64 is deformed upward and the fitting projection 65 moves up to the opening edge of the standby position stopper 37.

As the terminal cover 49 is further pushed forward, the fitting projection 65 moves to be fitted in the contact position stopper 38 and the elastic fitting piece 64 is deformed to restore its original shape. Thus, the terminal 17 is held in the contact position with respect to the lower housing 23. The terminal cover 49 is moved to a holding position (refer to FIG. 17).

When the terminal cover 49 is moved from the temporary holding position to the holding position with respect to the lower housing 23, the left pushing portion 74, which is on the lower surface of the terminal cover 49, comes in contact with the rear surface of the left elastic piece 68 and pushes the left elastic piece 68 frontward and the right pushing portion 75 comes in contact with the rear surface of the right elastic piece 69 and pushes the right elastic piece 69 forward. When the terminal cover 49 is moved and held in the holding position with respect to the lower housing 23, the left contact portion 70 and the right contact portion 71 of the terminal 17 come in contact with the terminal contact surface 19 of the conductive member 12 from the rear side and the left elastic piece 68 and the right elastic piece 69 are elastically deformed. This creates resilient force in the left elastic piece 68 and the right elastic piece 69, and the left contact portion 70 and the right contact portion 71 are pressed toward the terminal contact surface 19 by the resilient force. Furthermore, the left pushing portion 74 and the right pushing portion 75 push the left elastic piece 68 and the right elastic piece 69 forward, respectively. Therefore, the left contact portion 70 and the right contact portion 71 can be surely contacted with the terminal contact surface 19. This establishes electric connection between the conductive member 12 and the terminal 17 (refer to FIG. 18).

Figure 19:
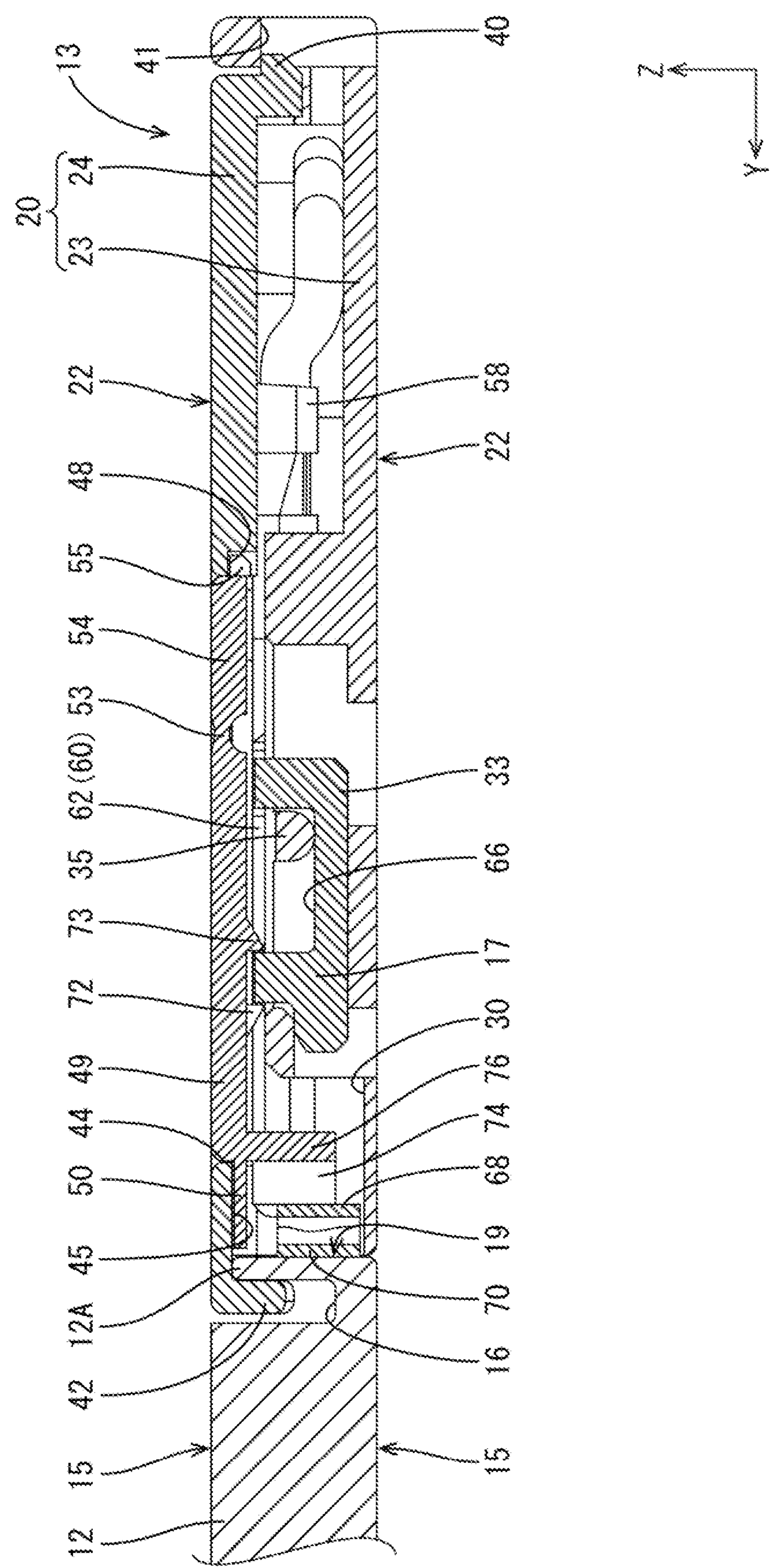
FIG. 19 is a cross-sectional view taken along XIX-XIX line in FIG. 18.
Figure 20:
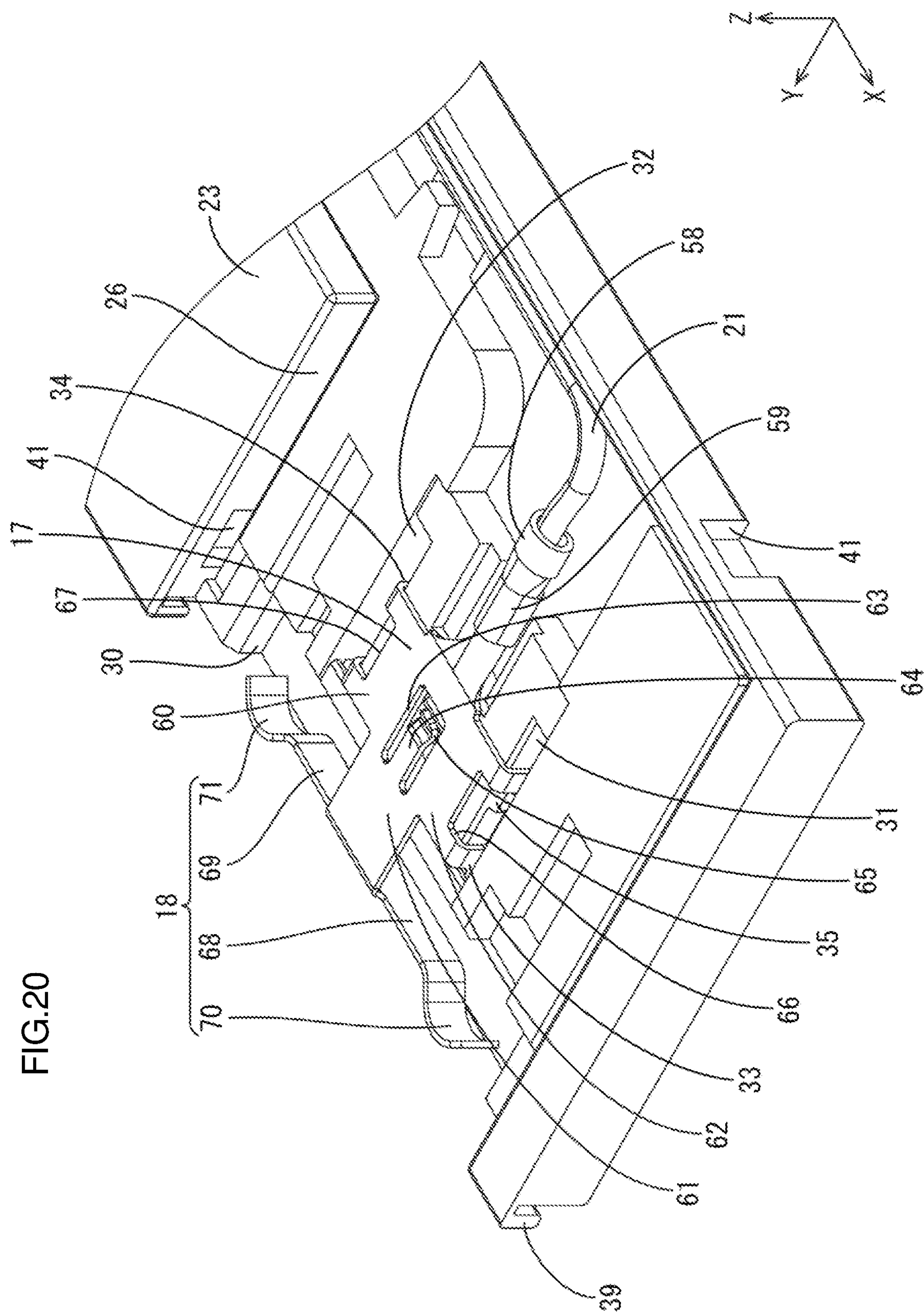
FIG. 20 is a partial enlarged perspective view illustrating the lower housing in which the terminal is held in a contact position.

As illustrated in FIGS. 19 and 20, when the terminal 17 is held in the contact position with respect to the lower housing 23, the left side front stopper 35 is in the left fitting hole 66 of the left guide piece 33 and is in contact with the rear hole edge of the left fitting hole 66 from the front side. Similarly, the right side front stopper is in the right fitting hole 67 of the right guide piece 34 and is in contact with the rear hole edge of the right fitting hole 67 from the front side. According to such a configuration, the terminal 17 is less likely to move further forward from the contact position.

After the terminal cover 49 is moved to be in the holding position with respect to the lower housing 23, the cover section 54 is pivoted around the hinge 53. The window hole 44 in the upper housing 24 is closed by the cover section 54. With the cover locking portions 55, which are on the rear edge of the cover section 54, being fitted to the cover lock receiving portion 48, which are at the rear hole edge of the window hole 44 of the upper housing 24, the window hole 44 in the upper housing 24 is closed by the cover section 54 and the closed state is maintained. In the closed state, the upper surface of the wiring module 13 is a plane surface (refer to FIG. 19).

Furthermore, when the lower-side fitting portion 39 and the upper-side fitting portion 42 are fitted in the groove 16, the conductive member-side contact surfaces 15, which are the upper and lower surfaces of the conductive member 12, and the wiring module-side contact surfaces 22, which are the upper and lower surfaces of the wiring module 13, are on the same plane, respectively.

The power storage elements 11 are arranged such that the electrode surfaces 14A, 14B of the adjacent power storage elements 11 have different polarities. The conductive member 12 and the wiring module 13 that are coupled together are arranged between the adjacent power storage elements 11. The conductive member 12 and the wiring module 13 that are coupled together do not project from the outline of the power storage elements 11 seen from the stacking direction (the upper-bottom direction) of the power storage elements 11. According to such a configuration, the power storage elements 11 are electrically connected to each other via the conductive members 12. Voltages of the power storage elements 11 are detected with the conductive members 12 and the terminals 17. The power storage elements 11 are held by a pressing member, which is not illustrated, with predefined pressure. Thus, the power storage module 10 is obtained (refer to FIG. 1).

To perform maintenance, the terminal 17 and the conductive member 12 can be electrically disconnected as follows. The pressing member is detached and the conductive member 12 and the wiring module 13 that are coupled together are separated from the power storage elements 11. The fitting of the cover locking portions 55 of the terminal cover 49 and the cover lock receiving portion 48 of the lower housing 23 is released and the cover section 54 is pivoted around the hinge 53. This allows the terminal cover 49 to move rearward from the holding position to the temporary position. In this state, the terminal cover 49 is pushed rearward. Then, the first holders 72 of the terminal cover 49 come in contact with the front edge of the upper plate section 62 of the terminal 17 and push the terminal 17 rearward. This moves the fitting projection 65 rearward from the contact position stopper 38 and the fitting projection 65 is fitted in the standby position stopper 37. Accordingly, the terminal 17 is moved to the standby position and the elastic contact portion 18 is away from the terminal contact surface 19 of the conductive member 12. As a result, the terminal 17 is electrically disconnected from the conductive member 12.

[Operations and Advantageous Effects of the Embodiment]

Next, operations and advantageous effects of this embodiment will be described. The power storage module 10 of this embodiment includes the power storage elements 11, the conductive member 12, and the wiring module 13. The power storage elements 11 include positive electrode surfaces 14A and negative electrode surfaces 14B on front and back surfaces, respectively. The conductive member 12 is electrically connected to the electrode surfaces 14 of the power storage elements 11. The wiring module 13 is electrically connected to the conductive member 12. The power storage elements 11 are arranged in the upper-bottom direction such that the electrode surfaces 14A, 14B of the adjacent power storage elements 11 are opposite each other. The electrode surfaces 14A, 14B of the adjacent power storage elements 11 are electrically connected by the conductive member 12 that is disposed between the electrode surfaces 14A, 14B of the adjacent power storage elements 11. The wiring module 13 is disposed between the adjacent power storage elements 11. The conductive member 12 and the wiring module 13 are disposed inside the outline of the power storage elements 11 seen from the upper-bottom direction.

Since the conductive member 12 and the wiring module 13 are disposed inside the outline of the power storage elements seen from the upper-bottom direction, the power storage module 10 can be miniaturized compared to a configuration in which the terminal to be connected to an external circuit projects from the edge of the conductive member 12.

According to this embodiment, the conductive member-side contact surface 15 of the conductive member 12 to be contacted with each of the electrode surfaces 14A, 14B and the wiring module-side contact surface 22 of the wiring module 13 to be contacted with each of the electrode surfaces 14A, 14B are on the same plane.

Since the conductive member-side contact surface 15 and the wiring module-side contact surface 22 are on the same plane, no level difference is created at a border between the conductive member 12 and the wiring module 13. According to such a configuration, the electrode surfaces 14A, 14B of the power storage element 11 are less likely to be deformed due to a step created by the level difference.

According to this embodiment, the wiring module 13 includes the housing 20 having insulating properties, the terminal 17 arranged in the housing 20, and the electric wire 21 connected to the terminal 17. The terminal 17 includes the elastic contact portion 18 that is elastically deformable. The conductive member 12 has the terminal contact surface 19 on its side edge that is not contacted with either of the electrode surfaces 14A, 14B. The elastic contact portion 18 of the terminal 17 is to be elastically contacted with the terminal contact surface 19.

With the elastic contact between the terminal contact surface 19 of the conductive member 12 and the elastic contact portion 18 of the terminal 17, the conductive member 12 and the terminal 17 are electrically connected. Therefore, the power storage module 10 is miniaturized compared to the configuration in which the terminal 17 for the external connection projects from the side edge of the conductive member 12.

According to this embodiment, the conductive member 12 includes the groove 16 adjacent to the side edge including the terminal contact surface 19. The groove 16 extends parallel to the terminal contact surface 19. The wiring module 13 includes the lower-side fitting portion 39 and the upper-side fitting portion 42 that are to be fitted to the groove 16.

With the lower-side fitting portion 39 and the upper-side fitting portion 42 of the wiring module 13 being fitted to the groove 16 of the conductive member 12, the conductive member 12 and the wiring module 13 are coupled to each other firmly. This improves reliability of electrical connection between the conductive member 12 and the terminal 17 included in the wiring module 13.

According to this embodiment, with the wiring module 13 and the conductive member 12 being coupled together, the terminal 17 is disposed in the housing 20 so as to be movable between the contact position in which the elastic contact portion 18 is in contact with the terminal contact surface 19 of the conductive member 12 and the standby position in which the elastic contact portion 18 is away from the terminal contact surface 19 of the conductive member 12. The housing 20 includes the standby position stopper 37 for holding the terminal 17 in the standby position and the contact position stopper 38 for holding the terminal 17 in the contact position.

With the terminal 17 being in the standby position, the elastic contact portion 18 of the terminal 17 is away from the terminal contact surface 19. This suppresses deformation of the elastic contact portion 18 caused by unintentional contact between the elastic contact portion 18 and the terminal contact surface 19. Furthermore, electrical connection between the elastic contact portion 18 and the terminal contact surface 19 is surely established by moving the terminal 17 in the contact position. This improves reliability of electrical connection between the conductive member 12 and the terminal 17.

According to this embodiment, one of the housing 20 and the terminal 17 includes the left side front stopper 35 and the right side front stopper that project toward another one of the housing 20 and the terminal 17 to suppress the terminal 17 from moving closer to the terminal contact surface 19 further from the contact position.

With the left side front stopper 35 and the right side front stopper, the terminal 17 is less likely to move closer to the terminal contact surface 19 further from the contact position. This suppresses the elastic contact portion 18 from being warped excessively. Accordingly, reliability of electrical connection between the conductive member 12 and the terminal 17 can be improved.

According to this embodiment, the housing 20 includes the window hole 44 in the section thereof corresponding to the terminal 17, and the housing 20 further includes the terminal cover 49 that covers the window hole 44 and is movable between the temporary holding position and the holding position. The terminal cover 49 includes the first holders 72 and the second holders 73. The first holders 72 are for holding the terminal 17 in the standby position with the terminal cover 49 being held in the temporary holding position. The second holders 73 are for holding the terminal 17 in the contact position with the terminal cover being held in the holding position.

By moving the terminal cover 49 from the temporary holding position to the holding position, an operator can move the terminal 17 from the standby position to the contact position without directly touching the terminal 17. This improves reliability in safety at the time of producing the power storage module 10.

According to this embodiment, the terminal cover 49 integrally includes the cover section 54 via the hinge 53. The cover section 54 projects from the housing 20 when the terminal cover 49 is in the temporary holding position. The cover section 54 is pivoted around the hinge 53 to close the window hole 44 when the terminal cover 49 is in the holding position. The housing 20, the terminal cover 49, and the cover section 54 are on the same plane with the window hole 44 being covered with the terminal cover 49 and the cover section 54.

The cover section 54 is not allowed to be closed when the terminal cover 49 is in the temporary holding position. The wiring module 13 including the cover section 54 projecting from the housing 20 and the power storage element 11 cannot be fitted together. On the other hand, when the terminal cover 49 is in the holding position, the terminal cover 49 and the cover section 54 are on the same plane as the housing 20 and therefore, the wiring module 13 and the power storage element 11 can be fitted together. According to such a configuration, an operator may not unintentionally mount the wiring module 13 in which the terminal cover 49 is held in the temporary holding position on the power storage element 11.

When the terminal cover 49 is held in the holding position, the window hole 44 is closed with the cover section 54 and an operator is less likely to touch the terminal 17.

According to this embodiment, the elastic contact portion 18 includes the left elastic piece 68, the right elastic piece 69, the left contact portion 70, and the right contact portion 71. The left elastic piece 68 and the right elastic piece 69 extend along the terminal contact surface 19 and are elastically deformable in a direction crossing the terminal contact surface 19. The left contact portion 70 and the right contact portion 71 are at the extended ends of the left elastic piece 68 and the right elastic piece 69, respectively, and project toward the terminal contact surface 19. The terminal cover 49 includes the left pushing portion 74 and the right pushing portion 75 that come in contact with the left elastic piece 68 and the right elastic piece 69 and push the elastic pieces toward the terminal contact surface 19 with the terminal cover 49 being held in the holding position.

With the left pushing portion 74 and the right pushing portion 75 pushing the left elastic piece 68 and the right elastic piece 69 toward the terminal contact surface 19, the left contact portion 70 and the right contact portion 71 can be surely contacted with the terminal contact surface 19. This improves reliability of electrical connection between the terminal 17 and the conductive member 12.

According to this embodiment, the housing 20 includes the wire groove 25 in which the electric wire 21 is routed and the pair of wire stoppers 27 projects from the bottom wall of the wire groove 25. The wire stoppers 27 are for holding the electric wire 21.

With the electric wire 21 being held between the wire stoppers 27, tension that may be applied to the electric wire 21 is less likely to be transferred to the terminal 17.

Other Embodiments (1) The number of power storage elements 11 included in the power storage module 10 is not limited and may be two, three, five or more.

(2) In this embodiment, the wiring module 13 is disposed behind the conductive member 12; however, the wiring module 13 may be disposed in front of the conductive member 12 or may be disposed on the left side or the right side of the conductive member 12. The wiring module 13 may be disposed in any positions with respect to the conductive member 12 as appropriate.

(3) The wire stoppers 27 may not be provided.

(4) In this embodiment, with the elastic contact portion 18 of the terminal 17 elastically coming in contact with the terminal contact surface 19 of the conductive member 12, the electrical connection between the terminal 17 and the conductive member 12 is established. However, the electrical connection between the terminal 17 and the conductive member may be established with any appropriate means such as soldering, brazing, and welding including ultrasonic welding, laser beam welding, arc welding, and electric resistance welding, and screwing, bolting, and riveting.

(5) The power storage elements 11 may be arranged in the front-rear direction or the right-left direction and in any appropriate direction.

(6) The power storage element 11 may be a secondary battery such as a lithium-ion secondary battery and a nickel-hydrogen secondary battery, or a capacitor.

(7) In this embodiment, the elastic contact portion 18 of the terminal 17 includes the left elastic piece 68 and the right elastic piece 69; however, the elastic contact portion 18 may include one elastic piece or three or more elastic pieces.

EXPLANATION OF SYMBOLS

10: Power storage module
11: Power storage element
12: Conductive member
12A: Rear edge end
13: wiring module
14A: Positive Electrode surface
14B: Negative Electrode surface
15: Conductive member-side contact surface
16: Groove
17: Terminal
18: Elastic contact portion
19: Terminal contact surface
20: Housing
21: Electric wire
22: Wiring module-side contact surface
23: Lower housing
24: Upper housing
25: Wire groove
26: Terminal housing section
27: Wire stopper
28: Projection
29: Fitting projection
30: Terminal window section
31: Left guide recess
32: Right guide recess
33: Left guide piece
34: Right guide piece
35: Left side front stopper
37: Standby position stopper
38: Contact position stopper
39: Lower-side fitting portion
40: Locking portion
41: Lock receiving portion
42: Upper-side fitting portion
43: Through hole
44: Window hole
45: Front flange receiving section
48: Cover lock receiving portion
49: Terminal cover
50: Front flange
51: Left flange
52: Right flange
53: Hinge 54: Cover section
55: Cover locking portion
57: Insulating sheath
58: Insulation barrel
59: Wire barrel
60: Fitting plate portion
61: Connection portion
62: Upper plate section
63: U-shaped slit
64: Elastic fitting piece
65: Fitting projection
66: Left fitting hole
67: Right fitting hole
68: Left elastic piece
69: Right elastic piece
70: Left contact portion
71: Right contact portion
72: First holder
73: Second holder
74: Left pushing portion
75: Right pushing portion
76: Left reinforcing portion
77: Right reinforcing portion

The invention claimed is:

1. A power storage module comprising:

power storage elements having electrode surfaces of positive electrode surfaces and negative electrode surfaces on front and back surfaces thereof;

a conductive member electrically connected to the electrode surfaces of the power storage elements; and a wiring module electrically connected to the conductive member, wherein the power storage elements are arranged in an arrangement direction such that the electrode surfaces of the power storage elements that are adjacent to each other are opposed to each other, the electrode surfaces of the power storage elements that are adjacent to each other are electrically connected by the conductive member that is disposed between the power storage elements that are adjacent to each other, the wiring module is disposed between the power storage elements that are adjacent to each other, the conductive member and the wiring module are disposed inside an outline of the power storage elements seen from the arrangement direction, the wiring module includes a housing having insulating properties, a terminal arranged in the housing, and an electric wire connected to the terminal, the terminal includes an elastic contact portion that is elastically deformable, the conductive member has a terminal contact surface on a side edge that is not contacted with one of the electrode surfaces, the elastic contact portion of the terminal is to be elastically contacted with the terminal contact surface, with the wiring module and the conductive member being coupled together, the terminal is disposed in the housing to be movable between a contact position in which the elastic contact portion is in contact with the terminal contact surface of the conductive member and a standby position in which the elastic contact portion is away from the terminal contact surface of the conductive member, the housing includes a standby position stopper for holding the terminal in the standby position and a contact position stopper for holding the terminal in the contact position, the housing includes a window hole in a section thereof corresponding to the terminal, the housing further includes a terminal cover that covers the window hole and is movable between a temporary holding position and a holding position, the terminal cover includes a first holder for holding the terminal in the standby position with the terminal cover being held in the temporary holding position and a second holder for holding the terminal in the contact position with the terminal cover being held in the holding position, and the electrode surfaces are terminals.

2. The power storage module according to claim 1, wherein the conductive member has a conductive member-side contact surface that is contacted with one of the electrode surfaces, the wiring module has a wiring module-side contact surface that is contacted with the one of the electrode surfaces, and the conductive member-side contact surface and the wiring module-side contact surface are on a same plane.

3. The power storage module according to claim 1, wherein the conductive member includes a groove adjacent to the side edge including the terminal contact surface, the groove extends along the terminal contact surface, and the wiring module includes a fitting portion to be fitted to the groove.

4. The power storage module according to claim 1, wherein one of the housing and the terminal includes a front stopper that projects toward another one of the housing and the terminal to suppress the terminal from moving closer to the terminal contact surface further from the contact position.

5. The power storage module according to claim 1, wherein the terminal cover integrally includes a cover section via a hinge, the cover section projects from the housing when the terminal cover is in the temporary holding position, the cover section is pivoted around the hinge to close the window opening when the terminal cover is in the holding position, and with the window hole being covered with the terminal cover and the cover section, the housing, the terminal cover, and the cover section are on a same plane.

6. The power storage module according to claim 1, wherein the elastic contact portion includes an elastic piece that extends along the terminal contact surface and is elastically deformable in a direction crossing the terminal contact surface and a contact portion that is at an extended end of the elastic piece and projects toward the terminal contact surface, and the terminal cover includes a pushing portion that comes in contact with the elastic piece and push the elastic piece toward the terminal contact surface with the terminal cover being held in the holding position.

7. The power storage module according to claim 1, wherein the housing includes a wire groove in which the electric wire is routed, and a pair of wire stoppers projects from a bottom wall of the wire groove for holding the electric wire.

* * * * *